(12) United States Patent
Li et al.

(10) Patent No.: US 11,047,818 B2
(45) Date of Patent: Jun. 29, 2021

(54) INTEGRATED ONLINE MEASUREMENT SYSTEM FOR THERMOPHYSICAL PROPERTY PARAMETERS OF NANOFLUID CUTTING FLUID

(71) Applicants: QINGDAO UNIVERSITY OF TECHNOLOGY, Qingdao (CN); UNIVERSITY OF SOUTHERN CALIFORNIA, Los Angeles, CA (US)

(72) Inventors: Changhe Li, Qingdao (CN); Min Yang, Qingdao (CN); Runze Li, Qingdao (CN); Yanbin Zhang, Qingdao (CN); Xianpeng Zhang, Qingdao (CN); Heju Ji, Qingdao (CN); Yali Hou, Qingdao (CN); Naiqing Zhang, Qingdao (CN); Qidong Wu, Qingdao (CN)

( * ) Notice: Subject to any disclaimer, the term of this patent is extended or adjusted under 35 U.S.C. 154(b) by 101 days.

(21) Appl. No.: 16/672,540

(22) Filed: Nov. 4, 2019

(65) Prior Publication Data

US 2020/0072774 A1    Mar. 5, 2020

Related U.S. Application Data

(63) Continuation of application No. PCT/CN2017/103323, filed on Sep. 26, 2017.

(30) Foreign Application Priority Data

May 17, 2017   (CN) .......................... 201710348464.5

(51) Int. Cl.
*G01N 25/18* (2006.01)
*G01K 1/08* (2021.01)
(Continued)

(52) U.S. Cl.
CPC .................................. *G01N 25/20* (2013.01)

(58) Field of Classification Search
USPC ................ 374/44, 141, 208, 179, 163, 166
See application file for complete search history.

(56) References Cited

U.S. PATENT DOCUMENTS

| 8,469,587 B2 | 6/2013 | Choi et al. |
| 2010/0223040 A1 | 9/2010 | Peursem et al. |

(Continued)

FOREIGN PATENT DOCUMENTS

| CN | 201429577 Y | 3/2010 |
| CN | 102323293 A | 1/2012 |

(Continued)

OTHER PUBLICATIONS

International Search Report of PCT/CN2017/103323, dated Feb. 22, 2018.

*Primary Examiner* — Mirellys Jagan
(74) *Attorney, Agent, or Firm* — True Shepherd LLC; Andrew C. Cheng

(57) ABSTRACT

The present invention discloses an integrated online measurement system for thermophysical property parameters of nanofluid cutting fluid, consisting of a gas path system, a fluid path system, a nanofluid thermal conductivity measurement device, a measurement device for a convective heat transfer coefficient and a nanofluid/workpiece heat partition ratio of the nanofluid cutting fluid, and a grinding force and grinding temperature measurement device or a milling force and milling temperature measurement device; the nanofluid thermal conductivity measurement device is located in the fluid path system; the gas path system provides pressure for the nanofluid in the fluid path system, two nozzles lead out from the fluid path system, and the nanofluid gas spray ejected by the nozzle I is sprayed onto the surface of a workpiece I to form the measurement device for the nanofluid convective heat transfer coefficient and the nanofluid/workpiece heat partition ratio; and the nanofluid (Continued)

gas spray ejected by the nozzle II is sprayed onto the surface of a workpiece II to form the grinding force and grinding temperature measurement device.

10 Claims, 19 Drawing Sheets

(51) Int. Cl.
  *G01K 1/14* (2021.01)
  *G01K 13/00* (2021.01)
  *G01K 7/02* (2021.01)
  *G01N 25/20* (2006.01)

(56) References Cited

U.S. PATENT DOCUMENTS

2015/0015266 A1  1/2015 Zhao et al.
2015/0126097 A1* 5/2015 Li .................... H01J 37/32568
                                                    451/450

FOREIGN PATENT DOCUMENTS

| CN | 106181596 A | 12/2016 |
| CN | 106198616 A | 12/2016 |
| CN | 106324025 A | 1/2017 |
| CN | 106918623 A | 7/2017 |
| KR | 20160034633 A | 3/2016 |
| TW | 201536480 A | 10/2015 |

* cited by examiner

INTEGRATED ONLINE MEASUREMENT SYSTEM FOR THERMOPHYSICAL PROPERTY PARAMETERS OF NANOFLUID CUTTING FLUID

CROSS-REFERENCE TO RELATED APPLICATIONS

This application is a continuation of International Patent Application No. PCT/CN2017/103323 with a filing date of Sep. 26, 2017, designating the United States, now pending, and further claims priority to Chinese Patent Application No. 201710348464.5 with a filing date of May 17, 2017. The content of the aforementioned applications, including any intervening amendments thereto, are incorporated herein by reference.

TECHNICAL FIELD

The present invention relates to a measurement system for thermophysical property parameters of nanofluid cutting fluid, and in particular to an integrated online measurement system for a nanofluid thermal conductivity, a convective heat transfer coefficient and a nanofluid/workpiece heat partition ratio.

BACKGROUND OF THE PRESENT INVENTION

In the machining, the traditional flood cooling causes serious pollution to the environment due to the use of a large amount of cutting fluid, and thus has been not suitable for the current era requirements of green production; dry cutting and minimum quantity lubrication satisfy the environmental protection requirements but have poor cooling and lubrication effects, and thus hardly obtain good workpiece surface quality, a certain proportion of nanoparticles are added to the minimum quantity lubrication base oil to improve the overall heat transfer capability of the jet flow, and meanwhile the nanoparticle jet minimum quantity lubrication (Nanoparticle jet Minimum Quantity Lubrication, referred to as Nano-MQL) for improving the lubrication effect of an oil film in the cutting area comes into the sight of people. The so-called nanoparticles refer to ultrafine micro solid particles having at least one-dimensional size in the three-dimensional size being smaller than 100 nm. The nanoparticle jet minimum quantity lubrication refers to adding nanosolid particles to the cutting fluid on the basis of minimum quantity lubrication, mixing and atomizing the nanoparticles, the cutting fluid and compressed air and ejecting the mixture into the cutting area in the form of jet flow to perform cooling and lubricating. According to the theory of solid heat transfer enhancement, based on the fact that the thermal conductivity of solid particles is much larger than those of fluid and gases, the surface area and the heat capacity of the nanoparticles are much larger than those of the solid particles in millimeters or micrometers at the same particle volume content, and the heat conductivity of the nanofluid cutting fluid formed by mixing the nanoparticles with the cutting fluid is significantly improved. Table 1 lists the thermal conductivities of commonly used nanoparticles. The mass fraction of nanofluid is generally 2%-8%, a certain proportion of nanoparticles are added to the base fluid to form nanoparticle suspension, then according to the type and the physico-chemical properties of the base fluid, a corresponding surface dispersant is added with the aid of ultrasonic vibration to obtain suspended stable nanofluid cutting fluid.

TABLE 1

| | Thermal conductivities of commonly used nanoparticles | | | | | | | |
|---|---|---|---|---|---|---|---|---|
| Material | Copper oxide | Aluminum oxide | Silicon | Aluminum | Copper | Diamond | Carbon nanotube | Graphene |
| Thermal conductivity $W(m \cdot K)^{-1}$ | 19.6 | 40 | 148 | 237 | 401 | 2300 | 3000 | 5000 |

The excellent lubrication and cooling effects of the nanoparticle jet minimum quantity lubrication have been confirmed by a large number of researchers. In the machining, the heat transfer performance of the nanofluid cutting fluid in the cutting area is measured by the thermal conductivity (k), the convective heat transfer coefficient (h) and the nanofluid/workpiece heat partition ratio (R). The thermal conductivity is an inherent nature of the nanofluid cutting fluid, and once the nanofluid configuration is completed, the thermal conductivity is determined.

As discovered in the retrieval, Li Changhe et al., Qingdao University of Technology, invented a device for measuring a nanofluid thermal conductivity and a convective heat transfer coefficient (Patent No.: ZL 201110221334.8), which can not only measure the nanofluid thermal conductivity, but also can measure the convective heat transfer coefficient at the same time, simulate a grinding fluid supply system of grinding processing via a hydraulic pump and heat the nanofluid by using a nickel-chromium alloy resistance wire to obtain a heat flow boundary condition the same as the grinding working condition, therefore the integration level and the utilization rate of the device are high, the measuring accuracy is high, the reliability is good, and the existing problems that the nanofluid thermal conductivity and the convective heat transfer coefficient are respectively measured by different devices are solved.

As discovered in the retrieval, Zhang et al., Wenzhou University, (Patent No.: ZL 201320422680.7) disclosed a nanofluid thermal conductivity measurement device. The container for placing the nanofluid is a heat-conductive container, a heat supply device and a heat absorption device are respectively arranged on the two sides of the container, the container completely transfers the heat provided by the heat supply device to the heat absorption device, and a heat absorption measurement device is arranged on the heat absorption device. The nanofluid thermal conductivity is measured by heating the outer side of the container to avoid the possibility of inaccurate measurement numerical values due to the uneven distribution of particles in the fluid during the measurement of heating the inner side of the container, the heat transferred by the container and the nanofluid is measured via the heat absorption device and the heat absorption measurement device, and finally the nanofluid thermal conductivity is obtained by a computational formula.

As discovered in the retrieval, Zheng et al. invented a device and a method for monitoring heat transfer and mass transfer of nanofluid (Patent No.: ZL 201610333181.9). By recording the ultrasonic attenuation amplitude of the nanofluid using non-Newtonian fluid as the base fluid at a measurement point and the distance between a measurement probe and a reflection plate, and repeatedly adjusting the position relation between the probe and the measurement point, a computer data processing system obtains nanofluid thermal conductivity increment and a nanofluid diffusion coefficient by analyzing the ultrasonic attenuation spectrum of an ultrasonic pulse, and the nanofluid thermal conductivity increment and the diffusion coefficient can be monitored in real time at high precision in a flow state.

As discovered in the retrieval, Sun et al., North China Electric Power University, provided a method for calculating the thermal conductivity of Au—H2O nanofluid (Patent No.: ZL 201610783769.4). The method includes: obtaining a volume fraction and a nanoparticle shape factor of the nanofluid nanoparticles, calculating a static thermal conductivity of the Au—H2O nanofluid, calculating a dynamic thermal conductivity of the Au—H2O nanofluid, and calculating an increase ratio of the effective thermal conductivity of the Au—H2O nanofluid compared with the thermal conductivity of the base fluid. By calculating the effective thermal conductivity of the Au—H2O nanofluid, the heat conduction mechanism of the Au—H2O nanofluid with extremely low volume fraction is disclosed.

The convective heat transfer coefficient is a comprehensive influence parameter of the volume fraction, the thermal conductivity, the specific heat capacity and the density of the nanofluid cutting fluid, and the value of the convective heat transfer directly determines the intensity of convective heat transfer of the nanofluid in the cutting area. The main factors affecting the convective heat transfer coefficient include: (1) the causes of convection and flow conditions; (2) the thermophysical properties of the fluid; (3) the shape, size and relative position of the heat transfer surface; and (4) presence of phase change of the fluid.

As discovered in the retrieval, Wu et al., Shanghai Second Polytechnic University, invented a system and a method for synchronously testing a nanofluid heat transfer coefficient and an influence rule thereof on the power generation efficiency of a thermoelectric power generation system (Patent No.: ZL 201610505891.5). The temperatures T1, T2 and Tw of the nanofluid at an inlet end of cold water bath, at a position 20-30 cm away from the inlet end and in the cold water bath are measured, and the enhanced convective heat transfer performance of the nanofluid is calculated according to the isothermal boundary condition. Thermocouples are arranged on heat sink from top to bottom to estimate the heat taken away by the nanofluid, and the thermoelectric conversion efficiency under different nanofluid working conditions is figured out in combination with the conversion power of a thermoelectric device. The synchronous test of influence of enhanced nanofluid heat transfer coefficients under different working conditions and enhanced nanofluid heat transfer properties under different working conditions on the cooling effect of a cold end of the thermoelectric device, and the influence rule of the thermoelectric conversion efficiency thereof is achieved, thereby reducing the measurement errors and improving the test accuracy. However, the convective heat transfer coefficient is measured and calculated by adopting in-tube convective heat transfer in the prior art, which does not satisfy theories related to a three-dimensional velocity field and a pressure field of gas, fluid and solid of nanoparticle jet flow in the actual nanoparticle jet minimum quantity lubrication cutting.

The nanofluid/workpiece heat partition ratio refers to the proportion of the heat flux taken away by the nanofluid to the heat flux flowing into the workpiece, and directly determines the maximum temperature of the cut workpiece. However, at present, there's no device or method for effectively measuring the nanofluid/workpiece heat partition ratio, and no device or method for measuring the convective heat transfer coefficient of nanofluid cutting fluid capable of simulating the actual flow field of a cutting nozzle, let alone a device or method for realizing the simultaneous online measurement of the nanofluid thermal conductivity, the convective heat transfer coefficient and the nanofluid/workpiece heat partition ratio.

SUMMARY OF PRESENT INVENTION

In view of the above problems, in order to overcome the deficiencies of the prior art, the present invention provides a measurement system for thermophysical property parameters of nanofluid cutting fluid, and in particular an integrated online measurement system for a thermal conductivity, a convective heat transfer coefficient and nanofluid/workpiece heat partition ratio of nanofluid cutting fluid, which can effectively measure the nanofluid thermal conductivity, can also simulate the air flow field at the outlet of a nanoparticle jet minimum quantity lubrication nozzle, and accurately measure the convective heat transfer coefficient and the nanofluid/workpiece heat partition ratio of the nanofluid cutting fluid.

The integrated online measurement system for thermophysical property parameters of nanofluid cutting fluid is composed of an air compressor, a hydraulic pump, a nanofluid thermal conductivity measurement device, a minimum quantity lubrication device, a measurement device for a convective heat transfer coefficient and a nanofluid/workpiece heat partition ratio of nanofluid cutting fluid, a grinding force and grinding temperature measurement device or a measurement device for nanoparticle jet minimum quantity lubrication milling force and milling temperature, wherein the nanofluid thermal conductivity measurement device is located in a fluid path of the integrated measurement system and is separately fixed in two glass tubes by using a transient double hot-wire method and long and short platinum wires via platinum wire brackets, the two glass tubes are connected by a rubber tube via connecting ports, and the two platinum wires are used as both heating wire sources and temperature measurement elements. A check valve is opened, and the nanofluid can only flow into the thermal conductivity measurement device, but not flow out. A constant temperature container is kept at a constant temperature by constant temperature circulating water, and after the system is stable, the thermal conductivity is accurately measured via a Wheatstone bridge. After the measurement is finished, the check valve is opened, and the nanofluid flows out from a nanofluid outlet. Compared with the existing nanofluid thermal conductivity measurement device, the measurement device of the present invention can better avoid the errors caused by the natural convection of the nanofluid, does not require repeated disassembly and assembly, and can realize convenient measurement.

The measurement device for the convective heat transfer coefficient and the nanofluid/workpiece heat partition ratio of nanofluid cutting fluid is located at the end of the integrated measurement system. A heat insulation device is made of a composite material formed by alumina ceramic and carbon nanotubes, wherein the carbon nanotubes are arranged perpendicular to the direction of heat transfer to ensure that the heat generated by the heat source can only be transferred to the surface of the workpiece along a vertical direction, and the heat can be prevented from dissipating to the outside of the heat insulation container by penetrating through a heat insulation side wall in the transfer process, thereby improving the heat insulation performance of the measurement device, ensuring that the heat can only be transferred along a predetermined direction and improving the final measurement precision. The angle and height of the nozzle are set, a heat insulation device end cover is fixed to the heat insulation device, and the power supply of a heating plate is turned on, so that the heating plate works at constant heat flux. After the system is stable, the minimum quantity lubrication device is opened, so that the nanofluid droplets are ejected to the surface of the workpiece at certain angle, speed and height. As only the upper surface of the workpiece in the heat insulation device exchanges heat with the outside, the rest three surfaces are heat insulated. According to the basic theory of heat transfer, by using the fluid dynamics and the Fourier heat transfer law, based on a mathematical model of exact solutions, starting from the analytic solution of the differential heat conduction equation of the workpiece, and by using the surface temperature of the workpiece measured by use of the principle of inversion and the thermocouple, the convective heat transfer coefficient and the nanofluid/workpiece heat partition ratio of the nanofluid cutting fluid are accurately inverted.

The measurement device for nanoparticle jet minimum quantity lubrication grinding force and grinding temperature accurately measures the surface temperature of the workpiece under a nanoparticle jet minimum quantity lubrication condition by using a thermocouple and measures the grinding force by using a grinding dynamometer. The grinding dynamometer platform consists of an integral member and two piezoelectric quartz crystal three-dimensional force sensors, and the grinding force applied to the workpiece in the grinding process can be decomposed into three components that are orthogonal to each other in space. After the measurement, the thermal conductivity of the nanofluid, the convective heat transfer coefficient of the nanofluid cutting fluid under grinding conditions, and the nanofluid/workpiece heat partition ratio under the grinding conditions can be obtained.

In the measurement device for nanoparticle jet minimum quantity lubrication milling force and milling temperature, a Morse spindle, a piezoelectric force measurement crystal group, an electrode lead, a conducting wire connecting block, a roller, the spindle lower end and the inner ring of a tapered roller bearing rotate with a machine tool spindle, and a fixing jacket, an end cover, the outer ring of the tapered roller bearing and a high voltage conversion device are fixed to the machine tool at rest, and thus the measurement of the milling force on a rotating tool is achieved. After the measurement, the thermal conductivity of the nanofluid, the convective heat transfer coefficient of the nanofluid cutting fluid under milling conditions, and the nanofluid/workpiece heat partition ratio under the milling conditions can be obtained.

In order to achieve the above objectives, the present invention adopts the following technical solutions:

An integrated online measurement system for a nanofluid thermal conductivity, a convective heat transfer coefficient and a nanofluid/workpiece heat partition ratio is composed of a gas path system, a fluid path system, a nanofluid thermal conductivity measurement device, a measurement device for a convective heat transfer coefficient and a nanofluid/workpiece heat partition ratio of the nanofluid cutting fluid, and a grinding force and grinding temperature measurement device or a milling force and milling temperature measurement device;

the nanofluid thermal conductivity measurement device is located in the fluid path system and includes a glass tube I and a glass tube II, which communicate with each other, a long platinum wire is installed in the glass tube I, a short platinum wire is installed in the glass tube II, and the long platinum wire and the short platinum wire are used as both heating heat sources and temperature measurement elements; the glass tube, in which the long platinum wire is installed, is provided with a nanofluid inlet and a nanofluid outlet, and the nanofluid inlet and the nanofluid outlet are connected with the fluid path system respectively via a check valve; and the gas path system provides pressure for the nanofluid in the fluid path system, two nozzles lead out from the fluid path system, and the nanofluid gas spray ejected by the nozzle I is sprayed onto the surface of a workpiece I to form the measurement device for the nanofluid convective heat transfer coefficient and the nanofluid/workpiece heat partition ratio; and the nanofluid gas spray ejected by the nozzle II is sprayed onto the surface of a workpiece II to form the grinding force and grinding temperature measurement device.

Further, the gas path system includes an air compressor, a filter, a gas storage tank, a pressure regulating valve II, a throttle valve II and a turbine flowmeter II, which are connected in sequence.

Further, the fluid path system includes a nanofluid storage tank, a hydraulic pump, a pressure regulating valve L a throttle valve I, a turbine flowmeter I, a check valve I and a check valve II, which are connected in sequence; and the check valve I is connected with the nanofluid inlet of the nanofluid thermal conductivity measurement device, and the check valve II is connected with the nanofluid outlet of the nanofluid thermal conductivity measurement device.

Further, the temperature difference between the long platinum wire and the short platinum wire in the nanofluid thermal conductivity measurement device is accurately measured by using a Wheatstone bridge.

Further, the glass tube I and the glass tube II are connected by a rubber tube via a connecting port I and a connecting port II; the check valve I is opened, the nanofluid enters the glass tube II via the nanofluid inlet after flowing out from the check valve I, and enters the glass tube I via the connecting port II, the rubber tube and the connecting port I. At this time, the check valve II is closed, the nanofluid can only flow into the nanofluid thermal conductivity measurement device, but cannot flow out; and the check valve II is opened after the temperature difference is measured, and the nanofluid flows out from the nanofluid outlet.

Further, the measurement device for a convective heat transfer coefficient and a nanofluid/workpiece heat partition ratio of the nanofluid cutting fluid includes a heat insulation device, a heating plate and two thermocouples, the heating plate is horizontally placed in the heat insulation device, the workpiece I is arranged on the heating plate, the two thermocouples are fixed in a through hole of the workpiece I and are placed on the upper surface of the heating plate, and the two thermocouples are respectively led to the two through holes in a bottom wall of the heat insulation device after passing by the edge of the heating plate.

Further, the heat insulation device is rectangular, and the side walls and the bottom wall of the heat insulation device and a heat insulation device end cover are made of a composite material formed by alumina ceramic and carbon nanotubes; and the composite material is based on the alumina ceramic, and the carbon nanotubes are formed by performing plasma sintering on fillers. The carbon nanotubes are arranged perpendicular to the heat transfer direction, that is, the carbon nanotubes are arranged perpendicular to the thickness directions of the side walls, the bottom wall and the heat insulation device end cover.

Further, the nozzle I and the nozzle II have the same structure and are all composed of a locating clamp, an intermediate sleeve and a nozzle body, and the spherical radius of the lower end of the locating clamp, the spherical hole radius of the upper end and the spherical radius of the lower end of the intermediate sleeve, and the spherical hole radius of the upper end of the nozzle body are equal; and the sphere of the lower end of the locating clamp can be installed in a spherical hole in the upper end of the intermediate sleeve, and the sphere of the lower end of the intermediate sleeve can be installed in the spherical hole in the upper end of the nozzle body.

Further, a fluid injection channel connector of the nozzle body is the nanofluid inlet, the nanofluid enters the fluid injection channel connector of the nozzle body through a fluid path tube, and a high-pressure gas enters a gas injection channel connector of the nozzle body through a gas path tube. The high-pressure gas enters a mixing chamber through air vents distributed in an air vent wall, is fully mixed and atomized with the nanofluid from the fluid injection channel connector in a nozzle mixing chamber, and enters a swirl chamber after being accelerated in an accelerating chamber, so that the high-pressure gas and the nanofluid are further mixed and accelerated, and are sprayed to the cutting area through the nozzle outlet in the form of atomized droplets.

Further, the grinding force and grinding temperature measurement device includes a thermocouple III, a thermocouple IV and a grinding dynamometer, the surface temperature of the workpiece under a nanoparticle jet minimum quantity lubrication condition is measured by using the thermocouple, and grinding force is measured by using the grinding dynamometer, and the grinding dynamometer platform consists of an integral member and two piezoelectric quartz crystal three-dimensional force sensors, and the grinding force applied to the workpiece in the grinding process can be decomposed into three components that are orthogonal to each other in space. After the measurement, the thermal conductivity of the nanofluid, the convective heat transfer coefficient of the nanofluid cutting fluid under grinding conditions, and the nanofluid/workpiece heat partition ratio under the grinding conditions can be obtained.

Further, the milling force and milling temperature measurement device includes a piezoelectric force measurement crystal group, an electrode lead, a conducting wire connecting block and a high voltage conversion device; the piezoelectric force measurement crystal group is installed at the lower end of a Morse spindle to rotate with the spindle and the tool; and the electrode lead is connected with the high voltage conversion device after being fixed by the conducting wire connecting block, and the high voltage conversion device is fixed, so that the cutting force on the rotating tool is measured.

Beneficial Effects of the Present Invention:

(1) the online measurement for the nanofluid thermal conductivity, and the convective heat transfer coefficient and the nanofluid/workpiece heat partition ratio of the nanofluid cutting fluid is achieved in the same system, therefore the integration level and the utilization rate of the device are high, the measuring accuracy is high, the reliability is good, and the existing problems that the nanofluid/workpiece heat partition ratio cannot be measured and that the thermophysical property parameters of the nanofluid need to be measured by different devices are solved;

(2) the nanofluid thermal conductivity measurement device is specifically a flowable nanofluid thermal conductivity measurement device, and the nanofluid sequentially enters the two connected glass tubes after entering from the nanofluid inlet and flows out from the nanofluid outlet after the measurement. Compared with the existing nanofluid thermal conductivity measurement device, the measurement device of the present invention can better avoid the errors caused by the natural convection of the nanofluid, does not require repeated disassembly and assembly, and can realize convenient measurement;

(3) the measurement device for the convective heat transfer coefficient and the nanofluid/workpiece heat partition ratio of the nanofluid cutting fluid is specifically a measurement device for a nanofluid convective heat transfer coefficient and a nanofluid/workpiece heat partition ratio under a high-pressure high-speed jet flow condition, which simulates the air flow field of actual nanoparticle jet minimum quantity lubrication, as the heat insulation device where the workpiece is located is formed by the composite material formed by the alumina ceramic and the carbon nanotubes, it can ensure that the heat generated by the heat source is only transferred to the surface of the workpiece along the vertical direction, starting from the analytic solution of the differential heat conduction equation of the workpiece, and by using the surface temperature of the workpiece obtained by use of the principle of inversion and the thermocouple, the convective heat transfer coefficient and the nanofluid/workpiece heat partition ratio of the nanofluid cutting fluid are accurately inverted; and (4) in the embodiment of the milling force measurement device, the Morse spindle, the piezoelectric force measurement crystal group, the electrode lead, the conducting wire connecting block, a roller, the spindle lower end and the inner ring of a tapered roller bearing rotate with a machine tool spindle, and a fixing jacket, an end cover, the outer ring of the tapered roller bearing and the high voltage conversion device are fixed to the machine tool to be kept stationary, and thus the measurement of the milling force on the rotating tool is achieved.

DESCRIPTION OF THE DRAWINGS

The drawings, constituting a part of the present application, are used to provide a further understanding of the present application. The schematic embodiments and the descriptions of the present application are used to explain the present application and do not constitute improper limitations to the present application.

Figure 1:
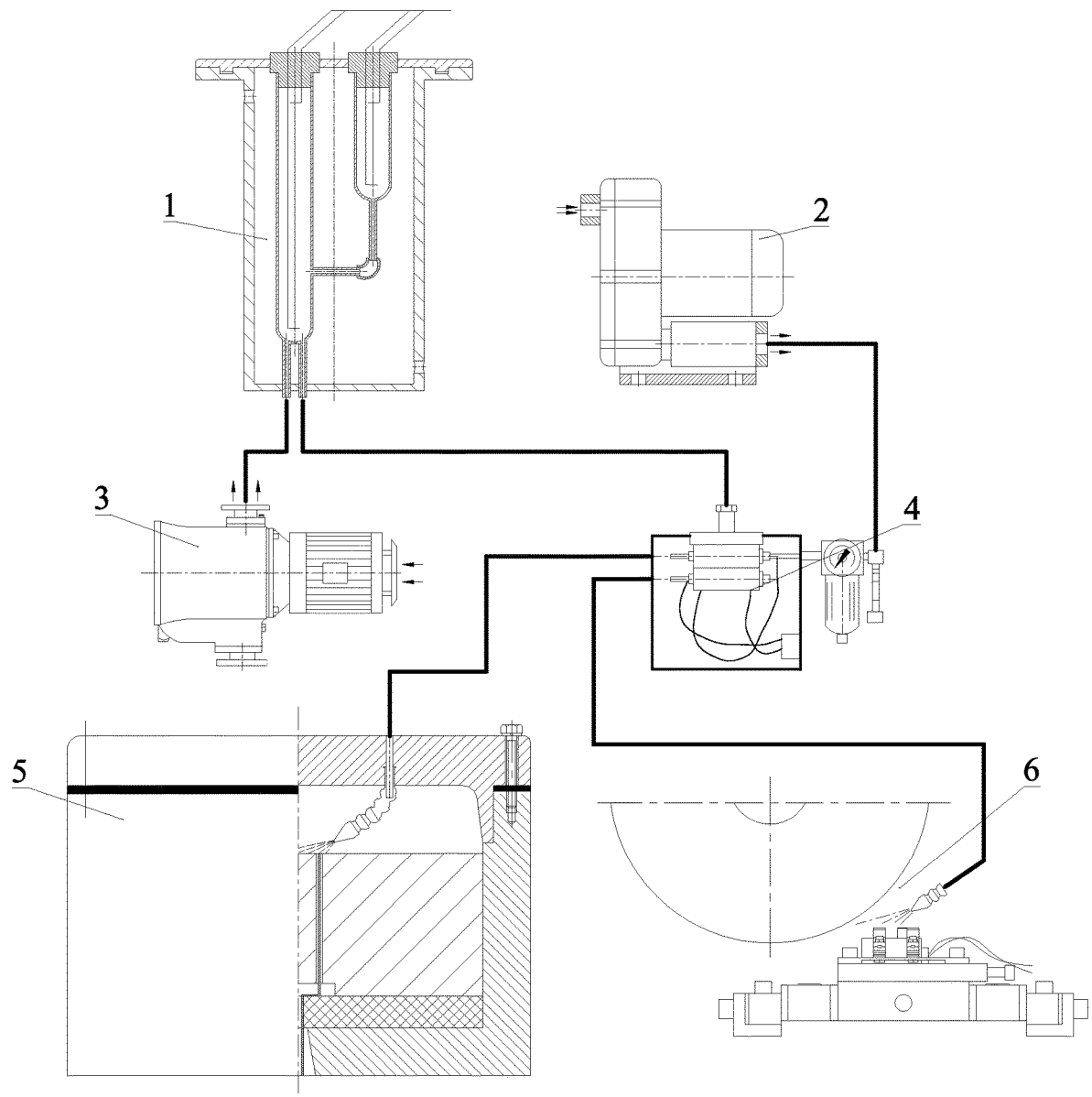
FIG. 1 is a diagram of an integrated measurement system for a thermal conductivity, a convective heat transfer coefficient and a nanofluid/workpiece heat partition ratio of nanofluid cutting fluid.

wherein, 1—nanofluid thermal conductivity measurement device, 2—air compressor, 3—hydraulic pump, 4—minimum quantity lubrication device, 5—measurement device for convective heat transfer coefficient and nanofluid/workpiece heat partition ratio of nanofluid cutting fluid, 6—grinding force and grinding temperature measurement device, 7—recycling box, 8—overflow valve, 9—nanofluid storage tank, 10—pressure regulating valve I, 11—throttle valve I 12—turbine flowmeter I, 13—check valve I, 14—check valve II, 15—filter, 16—gas storage tank, 17—pressure gage, 18—pressure regulating valve I, 19—throttle valve II, 20—turbine flowmeter II, 21—nozzle I, 22—nozzle II, 23—workpiece I, 24—workpiece II, 25—fluid path tube, 26—gas path tube;

- 21-1—locating clamp, 21-2—intermediate sleeve, 21-3—nozzle body;
- 21-3-1—mixing chamber, 21-3-2—air vent, 21-3-3—air vent wall, 21-3-4—accelerating chamber, 21-3-5—swirl chamber, 21-3-6—fluid injection channel connector, 21-3-7—gas injection channel connector;
- 101—rubber stopper I, 102—constant temperature container cover, 103—platinum wire bracket I, 104—platinum wire bracket II, 105—short platinum wire, 106—constant temperature container, 107—glass tube I, 108—connecting port I, 109—rubber tube, 1010—constant temperature water inlet, 1010—nanofluid outlet, 1012—nanofluid inlet, 1013—glass tube II, 1014—platinum wire bracket IV, 1015—connecting port II, 1016—long platinum wire, 1017—platinum wire bracket III, 1018—constant temperature water outlet, 1019—rubber stopper II, 1020—connecting copper wire IV, 1021—connecting copper wire III, 1022—connecting copper wire II, 1023—connecting copper wire I, 1024—connecting copper wire V;
- 501—screw I, 502—gasket I, 503—heat insulation device end cover, 504—gasket II, 505—heat insulation device, 506—heating plate, 507—workpiece bottom groove, 508—thermocouple I, 509—thermocouple II;
- 601—grinding wheel, 602—thermocouple III, 603—thermocouple IV, 604—grinding dynamometer;
- 604-1—screw, 604-2—stop dog, 604-3—annular block, 604-4—screw III, 604-5—screw IV, 604-6—dynamometer base, 604-7—screw V, 604-8—data collector, 604-9—signal transmission line, 604-10—flat plate I, 604-11—pressing plate, 604-12—screw VI, 604-13—nut, 604-14—gasket III, 604-15—screw VII, 604-16—flat plate II;
- 6'01—Morse spindle, 6'02—screw VII, 6'03—gasket IV, 604—sealing ring I, 6'05—tapered roller bearing I, 6'06—sleeve, 607—sleeve, 6'08—tapered roller bearing II, 6'09—sealing ring II, 6'010—piezoelectric force measurement crystal group, 6'011—key, 6'012—electrode lead, 6'013—high voltage conversion device, 6'014—roller, 6'015—conducting wire connecting block, 6'016—spindle lower end, 6'017—chuck, 6'018—locking nut, 6'019—tool, 6'020—gasket V, 6'021—pre-tightening screw, 6'022—fixing jacket, 6'023—gasket VI, 6'024—end cover, 6'025—locating shaft, 6'026—screw IX, 6'027—external conducting wire, 6'028—gasket VII, 6'029—gasket VIII, 6'030—screw X.

DETAILED DESCRIPTION OF PREFERRED EMBODIMENTS

It should be noted that the following detailed description is exemplary and is intended to provide further explanation to the present application. Unless defined otherwise, all technical and scientific terms used herein have the same meaning as commonly understood by those of ordinary skill in the art to which the present application belongs.

It should be noted that the terms used herein are merely for the purpose of describing specific embodiments, rather than limiting the exemplary embodiments of the present application. As used herein, the singular forms are also intended to include the plural forms, unless otherwise clearly indicated in the context, and further it should be understood that the terms "comprising" and/or "including" when used in the specification specify the presence of features, steps, operations, devices, components, and/or combination thereof.

The present invention will be further described below with reference to specific embodiments in the drawings of the specification.

Figure 19:
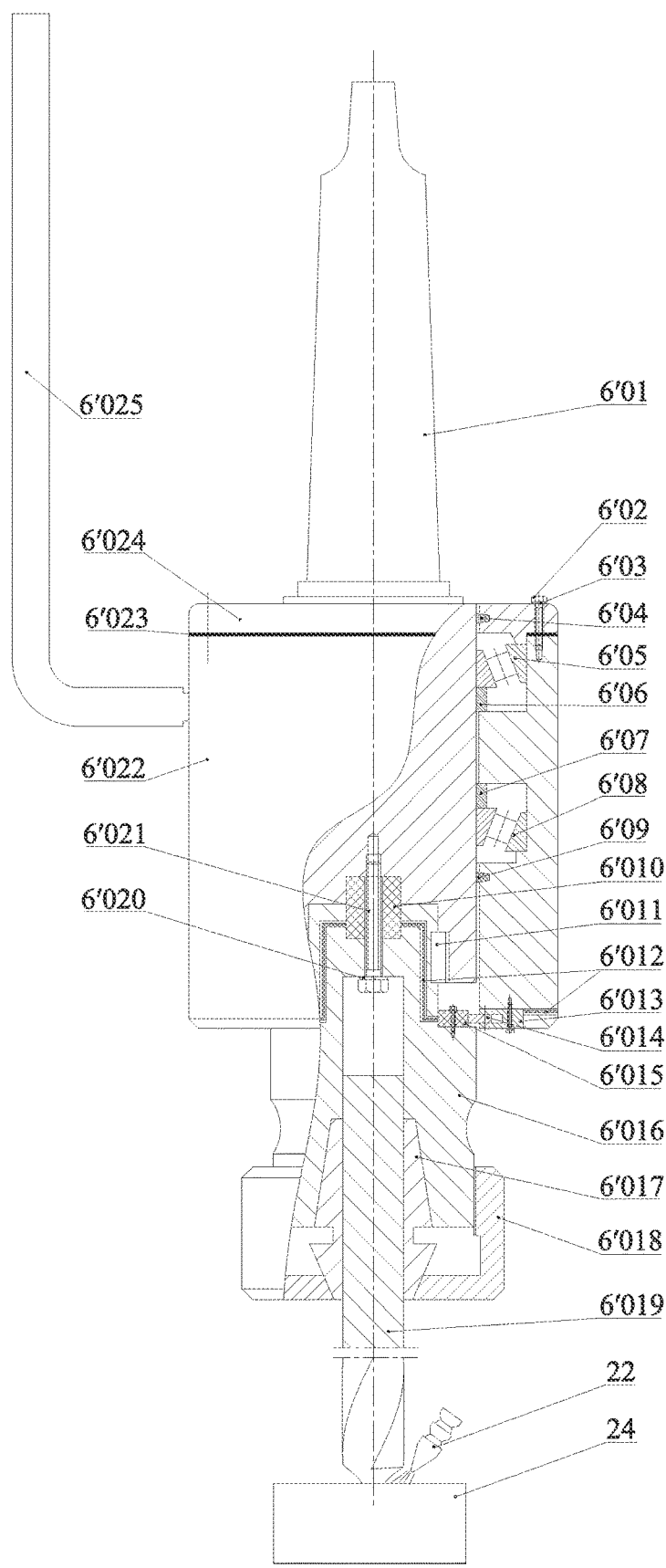
FIG. 19 is a sectional view of a structure of a milling dynamometer in a second embodiment.

As shown in FIG. 1, it is a measurement system for a nanofluid thermal conductivity, a convective heat transfer coefficient and a nanofluid/workpiece heat partition ratio, including a nanofluid thermal conductivity measurement device 1, an air compressor 2, a hydraulic pump 3, a minimum quantity lubrication device 4, a measurement device 5 for a convective heat transfer coefficient and a nanofluid/workpiece heat partition ratio of nanofluid cutting fluid, and a grinding force and grinding temperature measurement device 6 or a measurement device for nanoparticle jet minimum quantity lubrication milling force and milling temperature as shown in FIG. 19.

Figure 2:
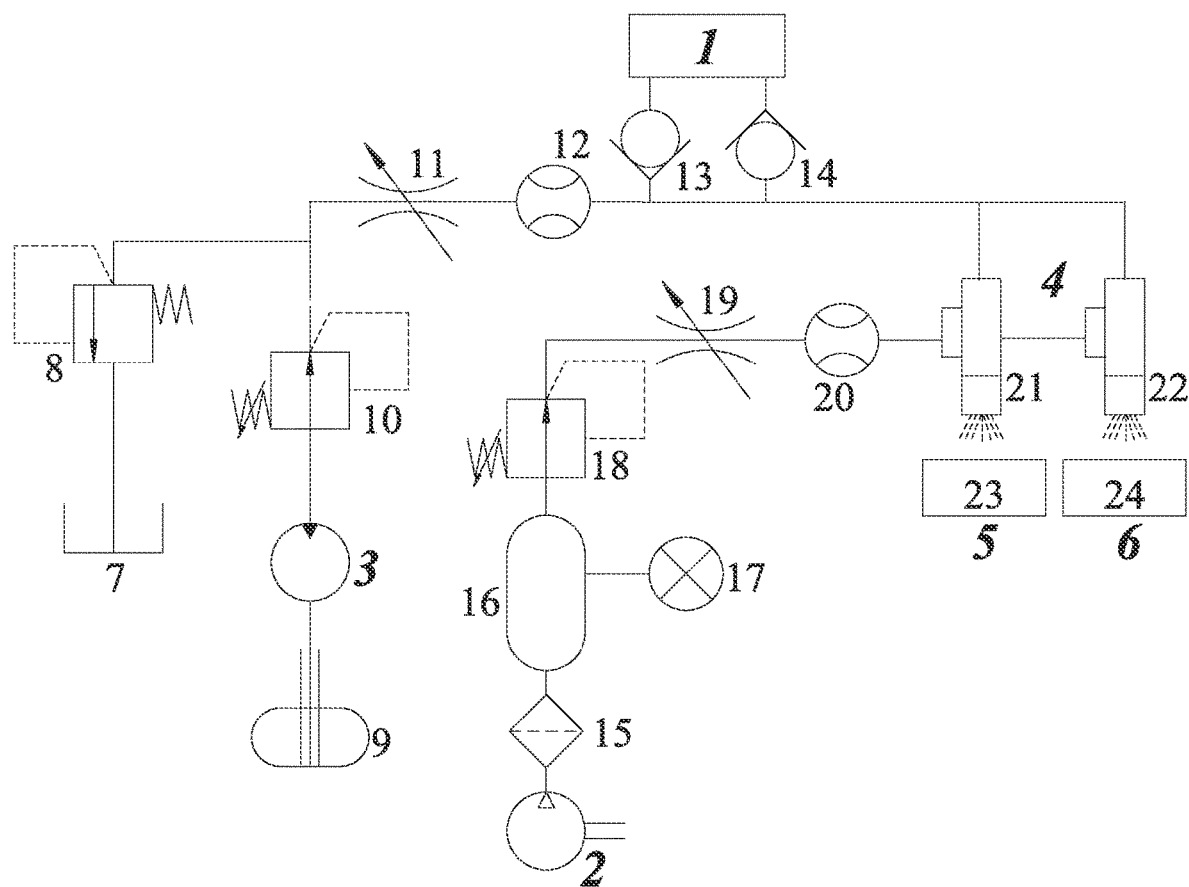
FIG. 2 is a diagram of a fluid path system and a gas path system of the measurement system for the thermal conductivity, the convective heat transfer coefficient and the nanofluid/workpiece heat partition ratio of the nanofluid cutting fluid.

FIG. 2 shows a schematic diagram of a fluid path system and a gas path system of the system, and as shown in the figure, a gas path is formed by the air compressor 2, a filter 15, a gas storage tank 16, a pressure regulating valve II 18, a throttle valve II 19 and a turbine flowmeter II 20, which are connected in series in sequence; and a fluid path is formed by a nanofluid storage tank 9, the hydraulic pump 3, a pressure regulating valve I 10, a throttle valve I 11, a turbine flowmeter I 12, a check valve I 13, the thermal conductivity measurement device 1 and a check valve II 14.

When at work, the hydraulic pump 3 is started, the nanofluid stored in the fluid storage tank 9 enters the nanofluid inlet of the minimum quantity lubrication device 4 after flowing through the fluid pressure regulating valve I 10, the fluid throttle valve I 11, the turbine flowmeter I 12, the check valve I 13, the thermal conductivity measurement device 1 and the check valve II 14. An overflow valve 8 and a nanofluid recycling box 7 form a protection loop, the overflow valve 8 functions as a safety valve, and when the pressure in the fluid path exceeds the set pressure, the overflow valve 8 is opened, so that the nanofluid flows into the recycling box 7 via the overflow valve 8. While the hydraulic pump 3 is started, the air compressor 2 is started, the high-pressure gas enters a compressed gas inlet of the minimum quantity lubrication device 4 after flowing through the filter 15, the gas storage tank 16, the gas pressure regulating valve II 18, the gas throttle valve II 19 and the turbine flowmeter II 20, and a pressure gauge 17 is used for monitoring the gas pressure of the gas storage tank 16. The nanofluid gas spray ejected by a nozzle I 21 is sprayed to the surface of a workpiece I 23 to form the measurement device 5 for the convective heat transfer coefficient and the nanofluid/workpiece heat partition ratio of the nanofluid cutting fluid; and the nanofluid gas spray ejected by a nozzle II 22 is sprayed to the surface of a workpiece II 24 to form the grinding force and grinding temperature measurement device 6.

Figure 3:
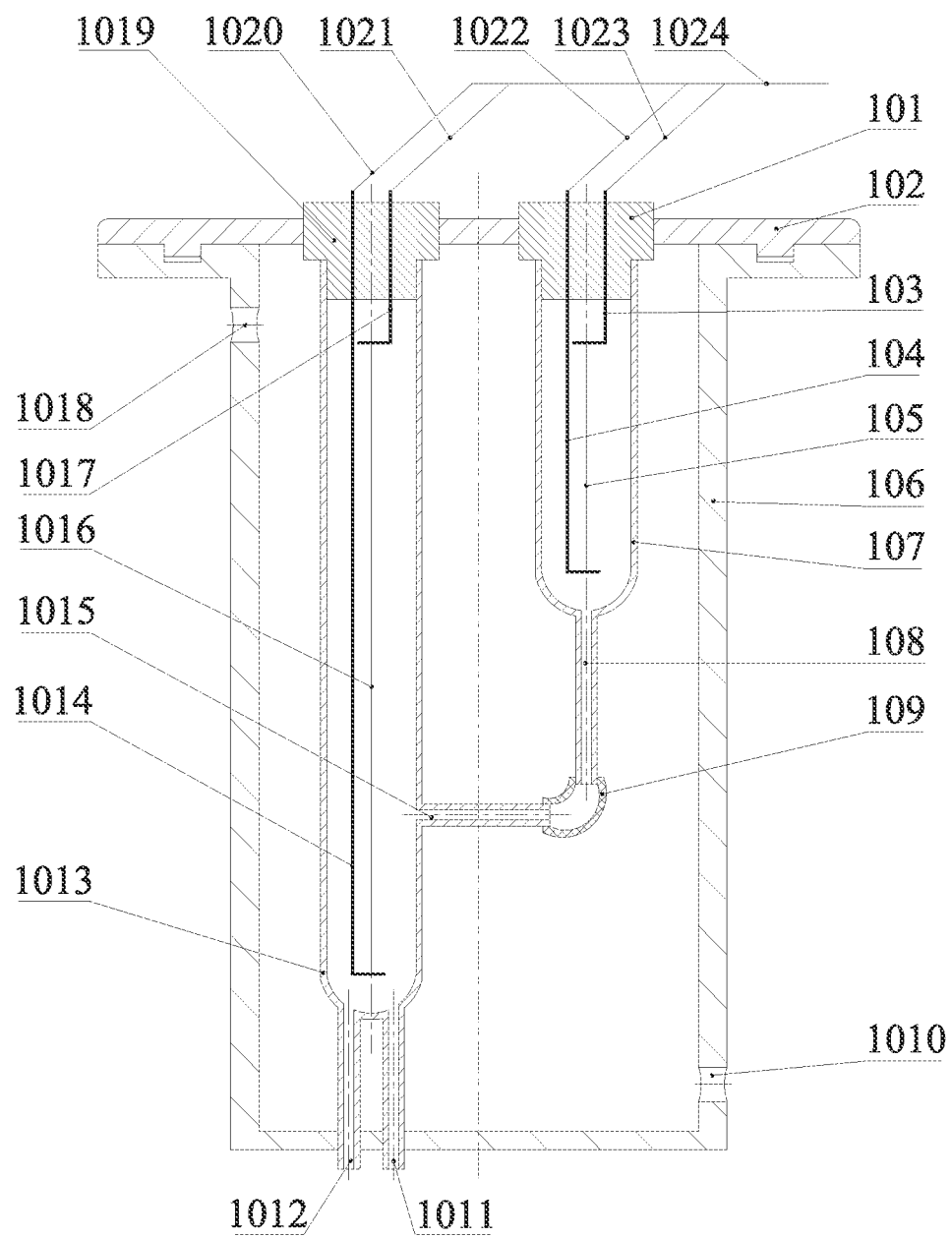
FIG. 3 is a sectional view of a thermal conductivity measurement device.
Figure 4:
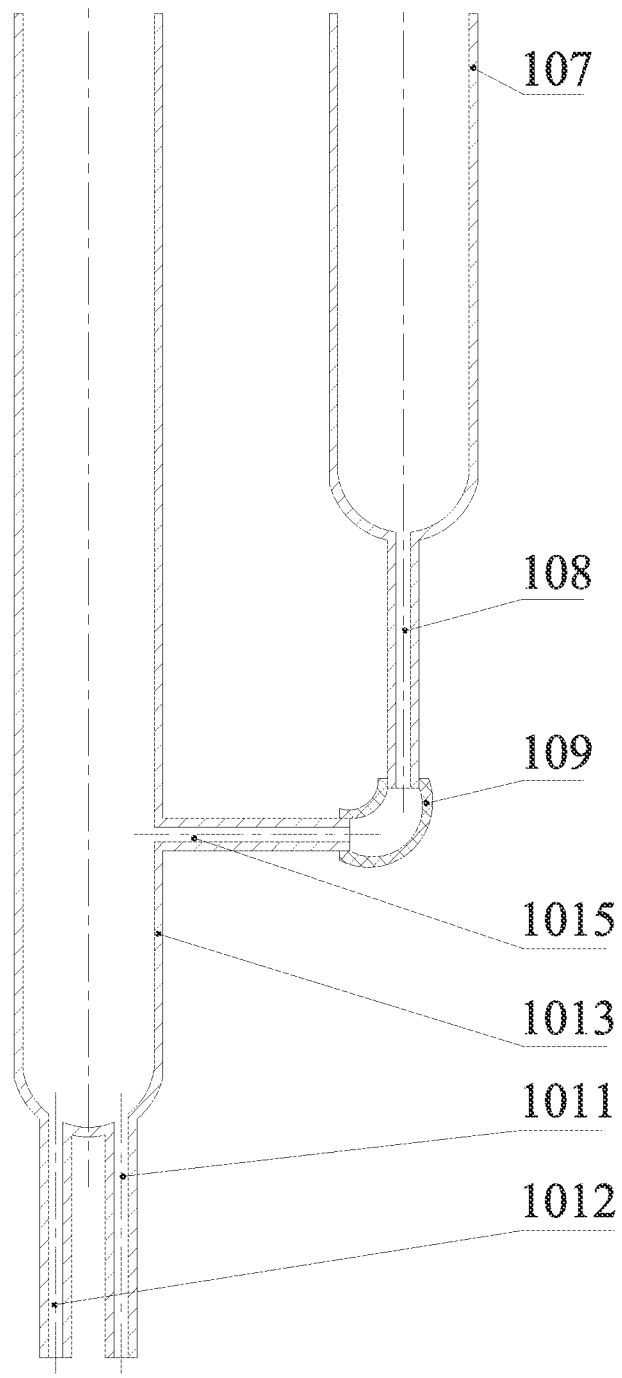
FIG. 4 is a connection diagram of glass tubes of the thermal conductivity measurement device.
Figure 5:
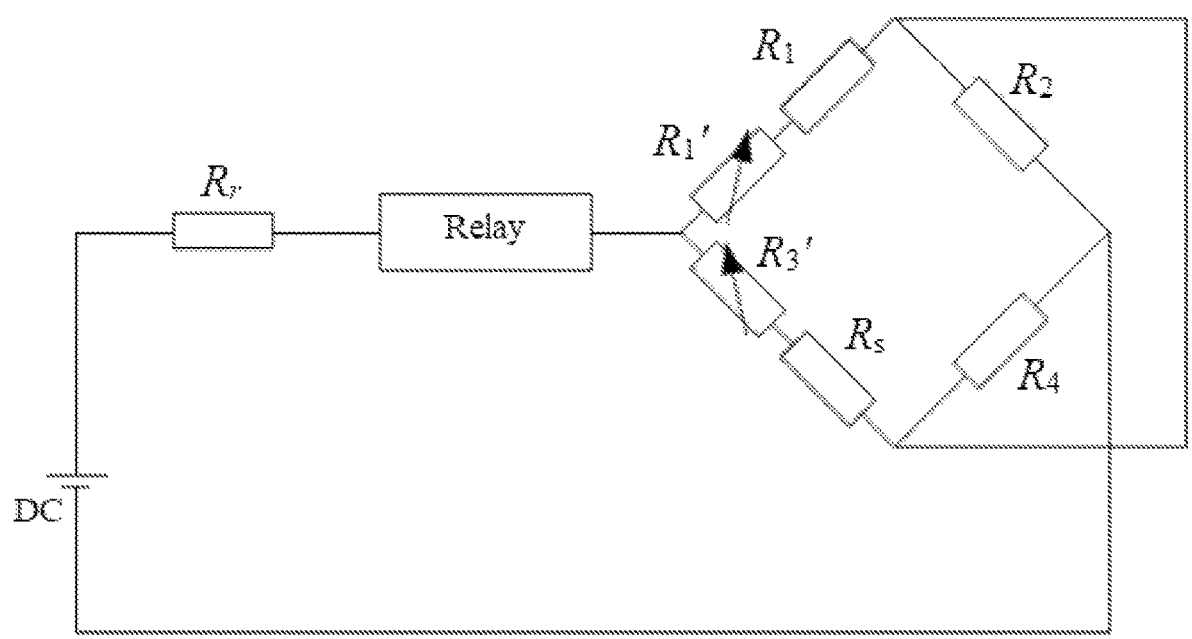
FIG. 5 is a diagram of a transient hot wire measurement system for the thermal conductivity.

The nanofluid thermal conductivity measurement device 1 is located in the fluid path of the measurement system and is separately fixed in two glass tubes by using a transient double hot-wire method and long and short platinum wires via platinum wire brackets, the two glass tubes are connected by a rubber tube via connecting ports, and the two platinum wires are used as both heating wire sources and temperature measurement elements. The check valve is opened, and the nanofluid can only flow into the thermal conductivity measurement device, but not flow out. A constant temperature container is kept at a constant temperature by constant temperature circulating water, and after the system is stable, the thermal conductivity is accurately measured via a Wheatstone bridge. After the measurement is finished, the check valve is opened, and the nanofluid flows out from the nanofluid outlet. Compared with the existing nanofluid thermal conductivity measurement device, the measurement device of the present invention can better avoid the errors caused by the natural convection of the nanofluid, does not require repeated disassembly and assembly, and can realize convenient measurement. The specific structures are as follows:

As shown in FIG. 3, the transient double hot-wire method is adopted, the diameters of the long platinum wire 1016 and the short platinum wire 105 are 20 μm, and the lengths are respectively 150 mm and 50 mm, and the diameters of the glass tube I 107 and the glass tube II 1013 are 30 mm. The two glass tubes are connected by the rubber tube 109 (as shown in FIG. 4) via a connecting port I 108 and a connecting port II 1015. The constant temperature container 106 is kept at the constant temperature by constant temperature circulating water, and the constant temperature water enters from a constant temperature water inlet 1010 and flows out from a constant temperature water outlet 1018. A rubber stopper I 101 and a rubber stopper II 1019 are fixed to a constant temperature container cover 102, and a platinum wire bracket I 103 and a platinum wire bracket II 104 extend into the glass tube I 107 through the rubber plug I 101, and a platinum wire bracket III 1017 and a platinum wire bracket IV 1014 extend into the glass tube II 1013 through the rubber stopper II 1019. The platinum wire brackets I 103, II 104, III 1017 and IV 1014 are respectively connected with connecting copper wires I 1023, II 1022, III 1021 and IV 1020, and are connected with a power supply by the connecting copper wire V 1024. The check valve I 13 is opened, the nanofluid enters the glass tube II 1013 from the nanofluid inlet 1012 after flowing out from the check valve I 13, and enters the glass tube I 107 via the connecting port II 1015, the rubber tube 109 and the connecting port I 108. At this time, the check valve II14 is closed, and the nanofluid can only flow into the thermal conductivity measurement device 1 and cannot flow out. After the system is stable, the nanofluid thermal conductivity is measured. The measurement principle is as follows:

The two hot wires differ in length only, when the same current is applied to the two hot wires at the same time, the two hot wires generate the same end cooling effect. In this way, the temperature difference between the two platinum wires is equivalent to the temperature rise of a limited part of an infinitely long hot wire, which can eliminate the heat dissipation influence at the end part of the hot wire and improve the measurement accuracy of the experimental data. Because the resistance of the platinum wire varies with temperature, the surface-insulated platinum wire inserted in the nanofluid serves as both the heating wire source and the temperature measurement element. FIG. 5 shows the diagram of the transient hot wire measurement system, and the resistance difference (that is, the temperature difference between the two hot wires) of the two hot wires is accurately measured by using the Wheatstone bridge. Rr represents a precision resistor of 1Ω, and the voltage drop over the two ends thereof is the current I output by the constant current source. R2 and R4 represent precision resistors with resistance values of 100Ω, R1' and R3' represent adjustable manganin resistors with extremely low temperature coefficient, and Rl and Rs represent resistors of the long and short platinum wires respectively. Before the test, small current of 5 mA is output to the bridge at first, the R1' and R3' are adjusted to enable the bridge to be in a balanced state, and at this time, the output of the bridge is zero (Ubd=0), that is $$(R_1'+R_l)R_4=(R_3'+R_s)R_2 \tag{1}$$

When the measurement is started, the constant current source outputs constant current I to the bridge, the temperatures of the long and short hot wires rise, and the resistances increase by dRl and dRs respectively. The relationship between the bridge output voltage dUbd and the resistance variables dR of the two hot wires is $$dU_{bd}=I(R_1'+R_l+dR_l)/2-I(R_3'+R_s+dRs)/2=I(dR_l-dR_s)/2=IdR/2 \tag{2}$$

Within a smaller temperature range, the relationship between the resistance of the platinum wire and the temperature can be expressed by the following formula:

$$R(T)=R(0)[1+a(T-273.15)] \tag{3}$$

in which: a represents the temperature coefficient of resistance of the platinum wire, which can be demarcated in advance, and R(0) represents the resistance of the platinum wire with a length L (L represents the length difference between the two hot wires). Differential is executed on the formula (3) to obtain $$dR=R(0)adT \tag{4}$$

The known basic equation for measuring the fluid thermal conductivity by using the transient hot wire method is:

$$k = \frac{\frac{q}{4\pi}}{\frac{dT}{d(\ln t)}} \quad (5)$$

Formula (4) and formula (2) are substituted in formula (5) to obtain an experimental expression of the thermal conductivity:

$$k = \frac{\left(\frac{I}{2}\right)^3 R(T)R(0)a}{\frac{4\pi L dU_{bd}}{d(\ln t)}} \quad (6)$$

Relevant data collected by a thermal conductivity data collection system are substituted into the formula to calculate the nanofluid thermal conductivity. In order to restrain the influence of the natural convection of the fluid on the measurement of the thermal conductivity of the fluid, an experimental measurement time is controlled within 5 seconds. After the measurement, the check valve II 14 is opened, and the nanofluid flows out from the nanofluid outlet 1011. Compared with the existing nanofluid thermal conductivity measurement device, the nanofluid thermal conductivity measurement device can better avoid the errors caused by the natural convection of the nanofluid, does not require repeated disassembly and assembly, and can realize convenient measurement.

Figure 6:
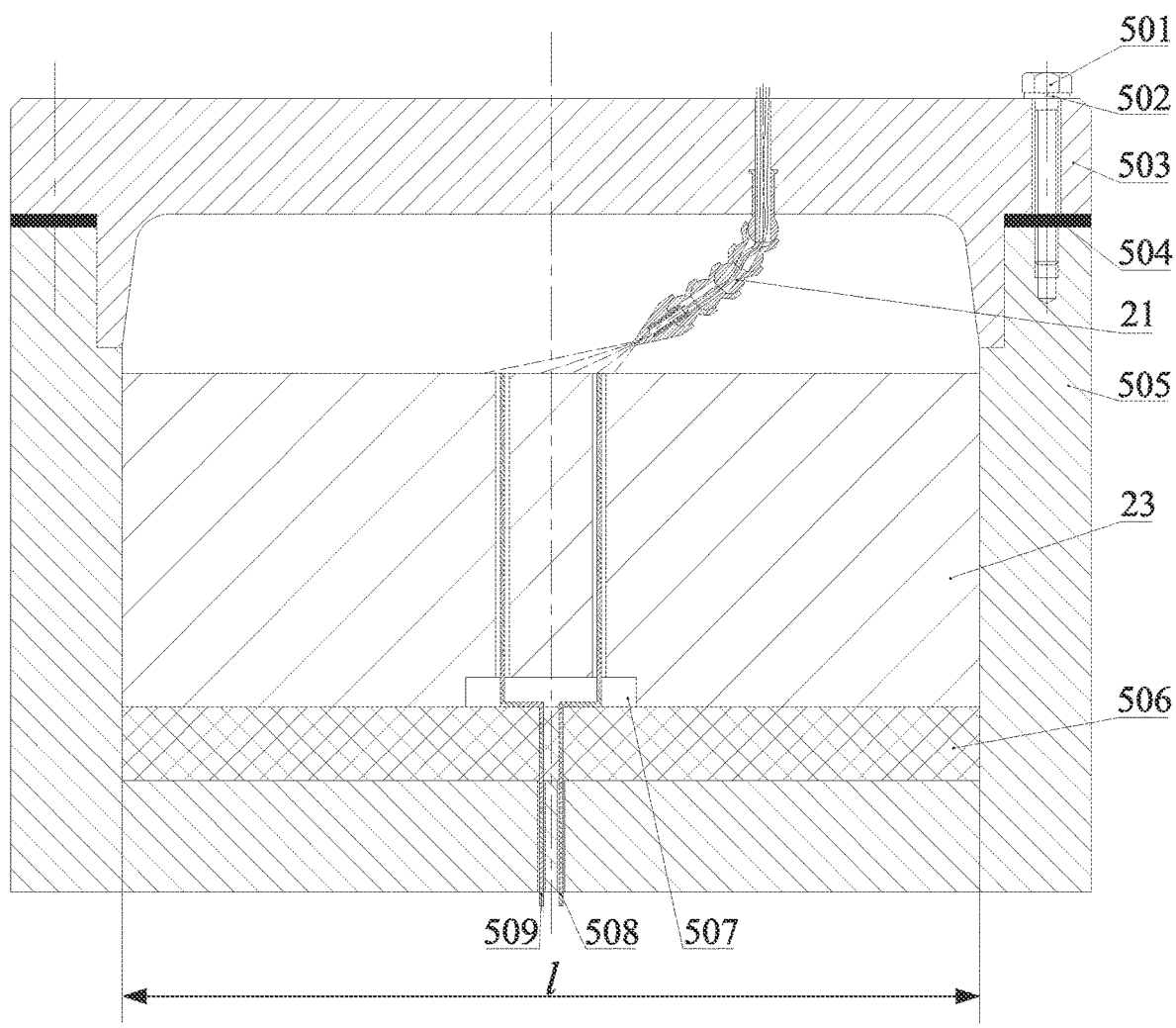
FIG. 6 is a sectional view of the measurement system for the convective heat transfer coefficient and the nanofluid/workpiece heat partition ratio of the nanofluid cutting fluid.
Figure 7:
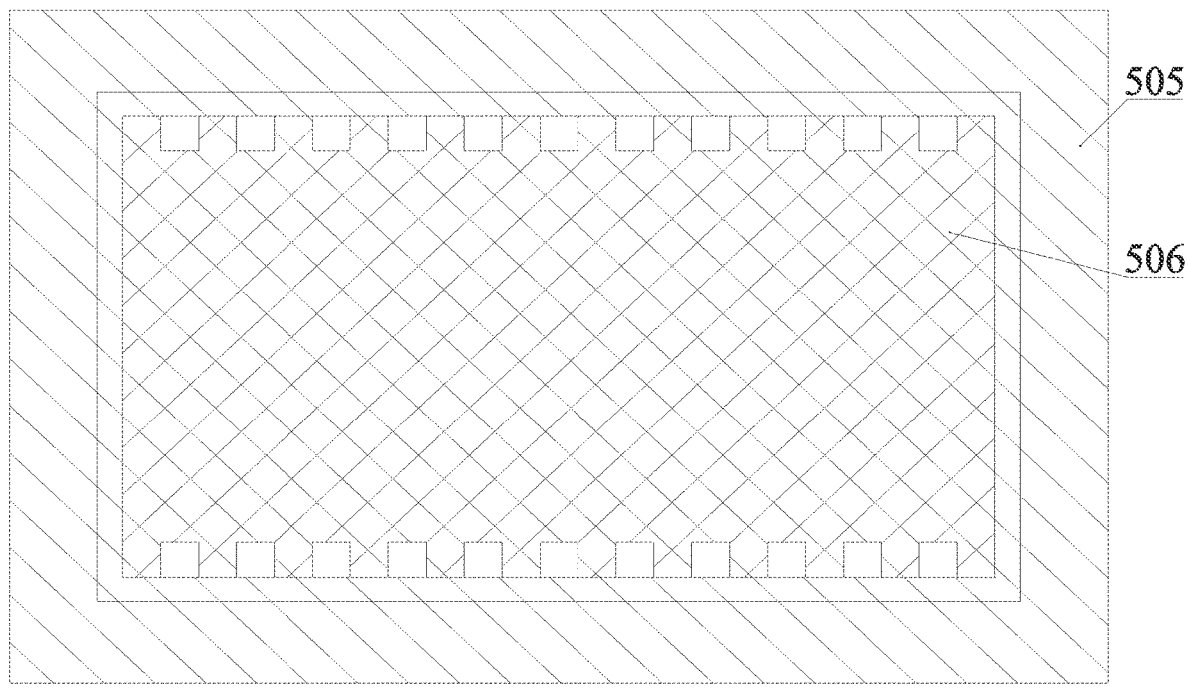
FIG. 7 is an installation diagram of a heat insulation device and a heating plate.

FIG. 6 shows the measurement device for a convective heat transfer coefficient and a nanofluid/workpiece heat partition ratio of the nanofluid cutting fluid. As shown in the figure, a groove 507 is machined in the bottom of the workpiece I 23, and two through holes are machined in the groove. A thermocouple I 508 and a thermocouple II 509 are respectively introduced into the two through holes from the bottom of the workpiece I 23, and nodes of the two thermocouples are located on the same plane as the surface of the workpiece I 23. The workpiece I 23 is placed in a heat insulation device 505, and a heating plate 506 (as shown in FIG. 7) is arranged at the bottom of the workpiece I 23. The heating plate 506 is caused to work at constant heat flux qt, then the heat can only be transferred from the bottom of the workpiece I 23 to the upper surface of the workpiece I 23. When the system reaches a heat stability state, the nanofluid is ejected from the nozzle I 21 and then is sprayed on the surface of the workpiece I 23 in the form of jet flow, the two thermocouples transmit collected temperature signals to a data processor, and the heat transfer coefficient and the nanofluid/workpiece heat partition ratio of the nanofluid cutting fluid convective are measured by an inversion processing program of a computer.

Figure 8:
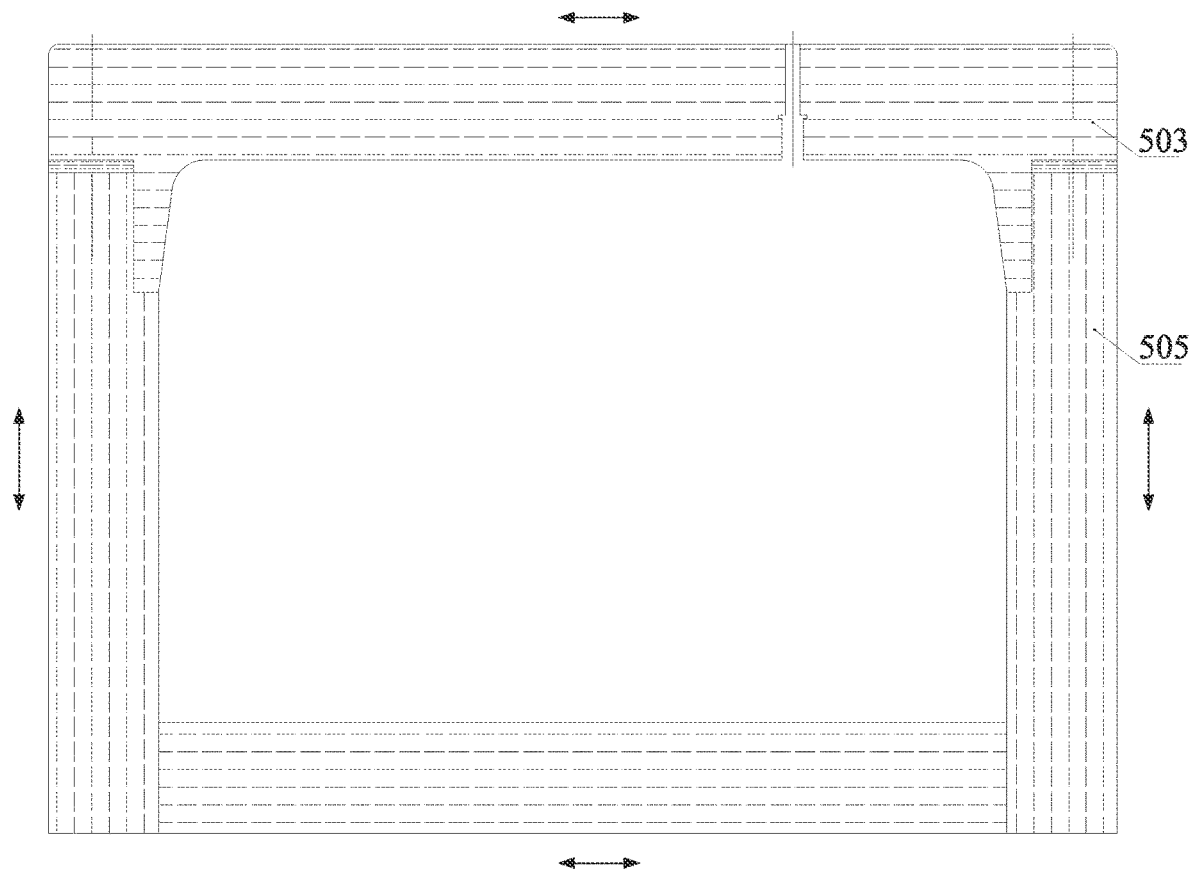
FIG. 8 is a diagram of an arrangement direction of carbon nanotubes of the heat insulation device.

The heat insulation device 505 is rectangular, the heating plate 506 is installed in the heat insulation device 505, the two thermocouples are fixed in the through holes of the workpiece I 23 and are placed on the upper surface of the heating plate 506, the two thermocouples are introduced into the two through holes in the bottom wall of the heat insulation device 505 after passing through the edge (FIG. 7) of the heating plate, and the inner space length of the heat insulation device 505, the length of the heating plate and the length of the workpiece are all 1. After a nozzle I 21 is fixed in a heat insulation device end cover 503 and after the height and the angle of the nozzle I 21 are adjusted, the heat insulation device end cover 503 is fixed to the heat insulation device 505 by a screw I 501 and a gasket I 502, and a gasket II 504 can adjust the gap and the play between the heat insulation device end cover 503 and the heat insulation device 505. The side walls and the bottom wall of the heat insulation device 505 and the heat insulation device end cover 503 are both made of a composite material formed by alumina ceramic and carbon nanotubes, the composite material is based on the alumina ceramic, and the carbon nanotubes are formed by performing plasma sintering on fillers. The carbon nanotubes are arranged perpendicular to the heat transfer direction (FIG. 8), that is, the carbon nanotubes are arranged perpendicular to the thickness directions of the heat insulation side walls, the bottom wall and the heat insulation device end cover. The carbon nanotube is a tubular material that is curled from graphite carbon atoms and has a diameter of several nanometers to tens of nanometers, and the carbon nanotubes can be arranged continuously or discontinuously. The carbon nanotubes have unique heat conductivity and excellent axial heat conductivity, but are not thermally conductive on the radial direction, therefore, when the heat is transferred perpendicular to the carbon nanotubes, the heat is not transferred along the radial direction of the carbon nanotubes, and the carbon nanotubes reflect back the heat. Therefore, the heat insulation device has excellent heat insulation performance, has a higher heat insulation effect than the traditional alumina ceramic, can ensure that the heat generated by the heat source can only be transmitted to the surface of the workpiece along the vertical direction, and can prevent the heat from dissipating to the outside of the heat insulation container by penetrating through the heat insulation side wall in the transfer process, thereby improving the heat insulation performance of the measurement device, ensuring that the heat can only be transferred along a predetermined direction and improving the final measurement precision.

Figure 9:
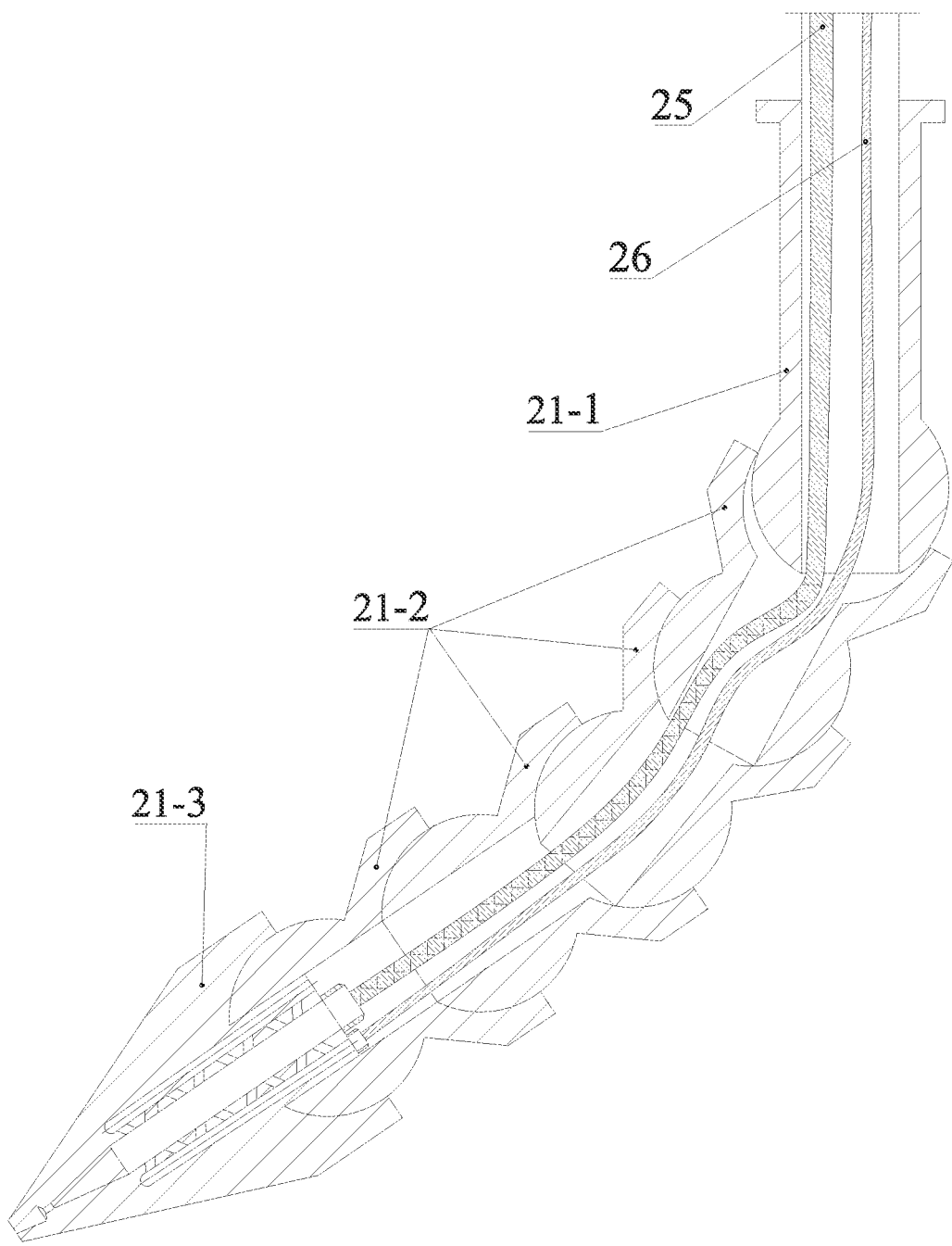
FIG. 9 is a sectional view of a nozzle structure.
Figure 10:
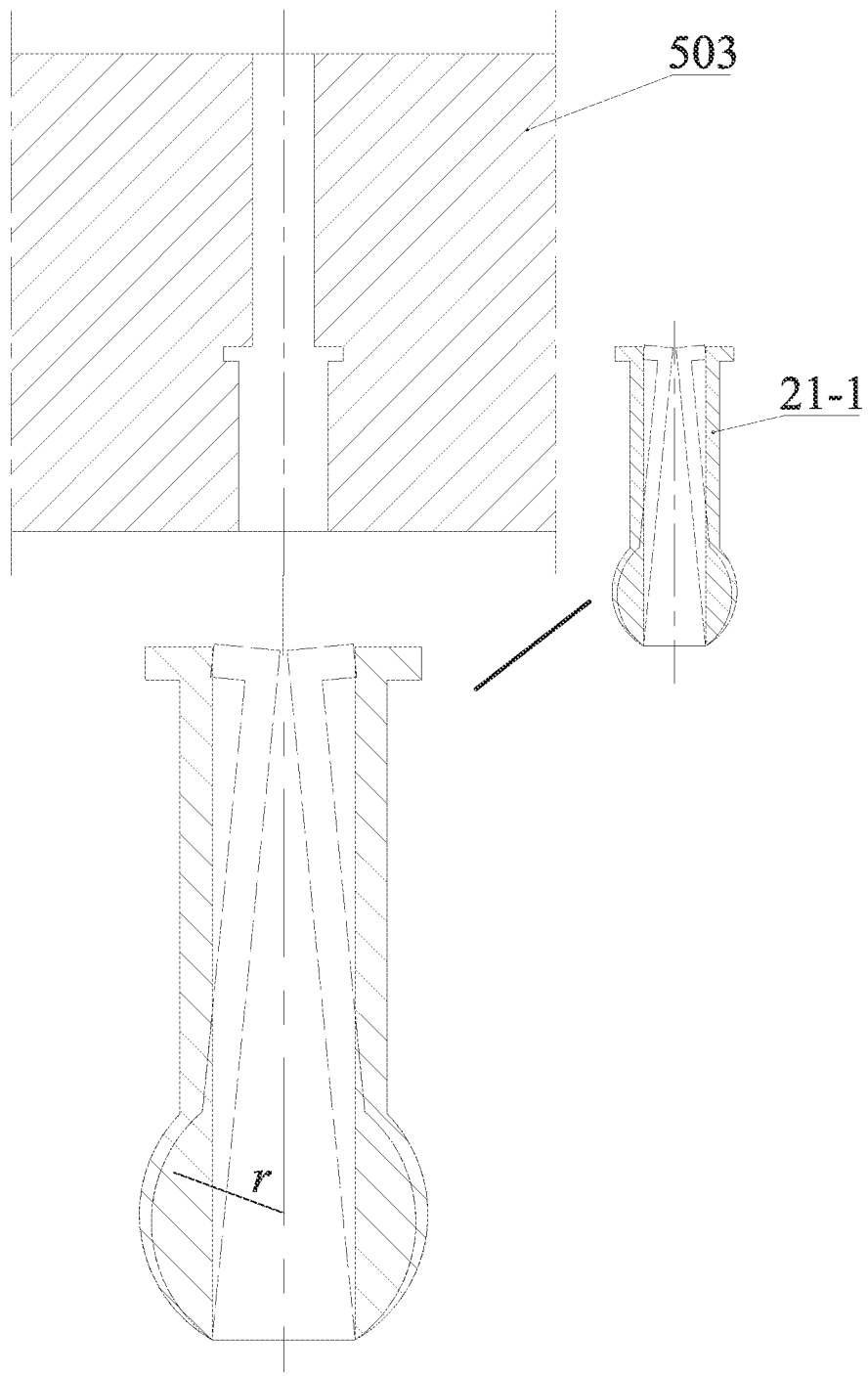
FIG. 10 is an installation diagram of a locating clamp.
Figure 11:
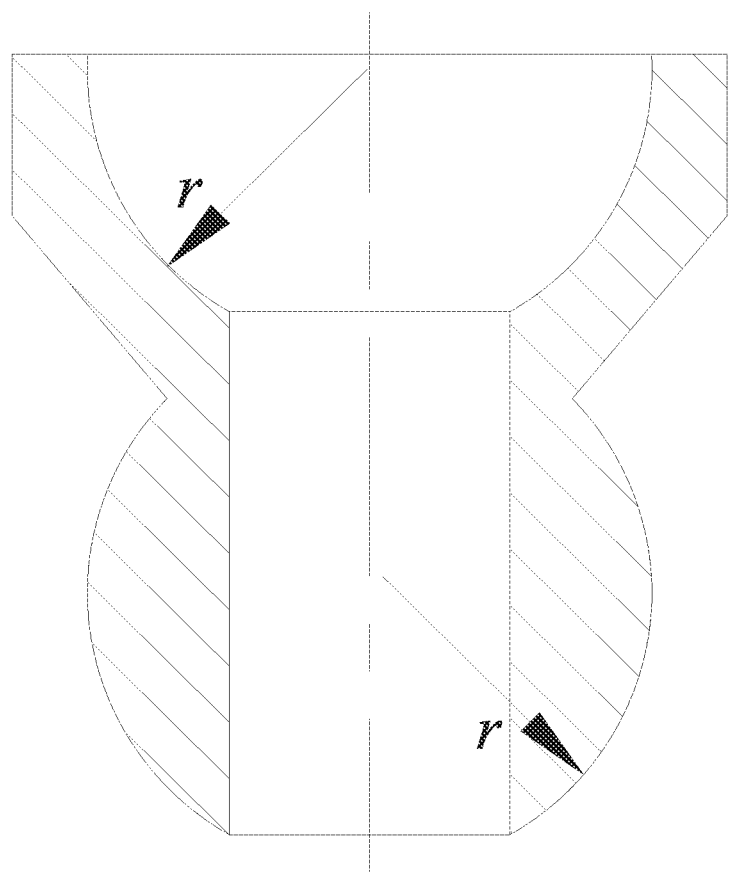
FIG. 11 is a sectional view of an intermediate sleeve.

In the present invention, the structures of the nozzle I and the nozzle II are the same, with the nozzle I as an example, FIG. 9 shows the sectional view of the structure of the nozzle I 21, as shown in the figure, 25 represents a fluid path tube of the whole system, 26 represents a gas path tube of the whole system, 21-1 represents a locating clamp of the nozzle I 21, 21-2 represents an intermediate sleeve, and 21-3 represents a nozzle body. As shown in FIG. 10, the locating clamp 21-1 is made of a resin material, in FIG. 10, the solid line graph is the original shape thereof, and it can change into a dotted line graph after being stressed, and the locating clamp 21-1 is installed in the heat insulation device end cover 503 after being deformed by stress. The spherical radius of the lower end of the locating clamp 21-1, the spherical hole radius of the upper end and the spherical radius of the lower end of the intermediate sleeve 21-2 (FIG. 11), and the spherical hole radius of the upper end of the nozzle body 21-3 are r, therefore the sphere of the lower end of the locating clamp 21-1 can be installed in a spherical hole in the upper end of the intermediate sleeve 21-2, and the sphere of the lower end of the intermediate sleeve 21-2 can be installed in the spherical hole in the upper end of the nozzle body 21-3.

Figure 12:
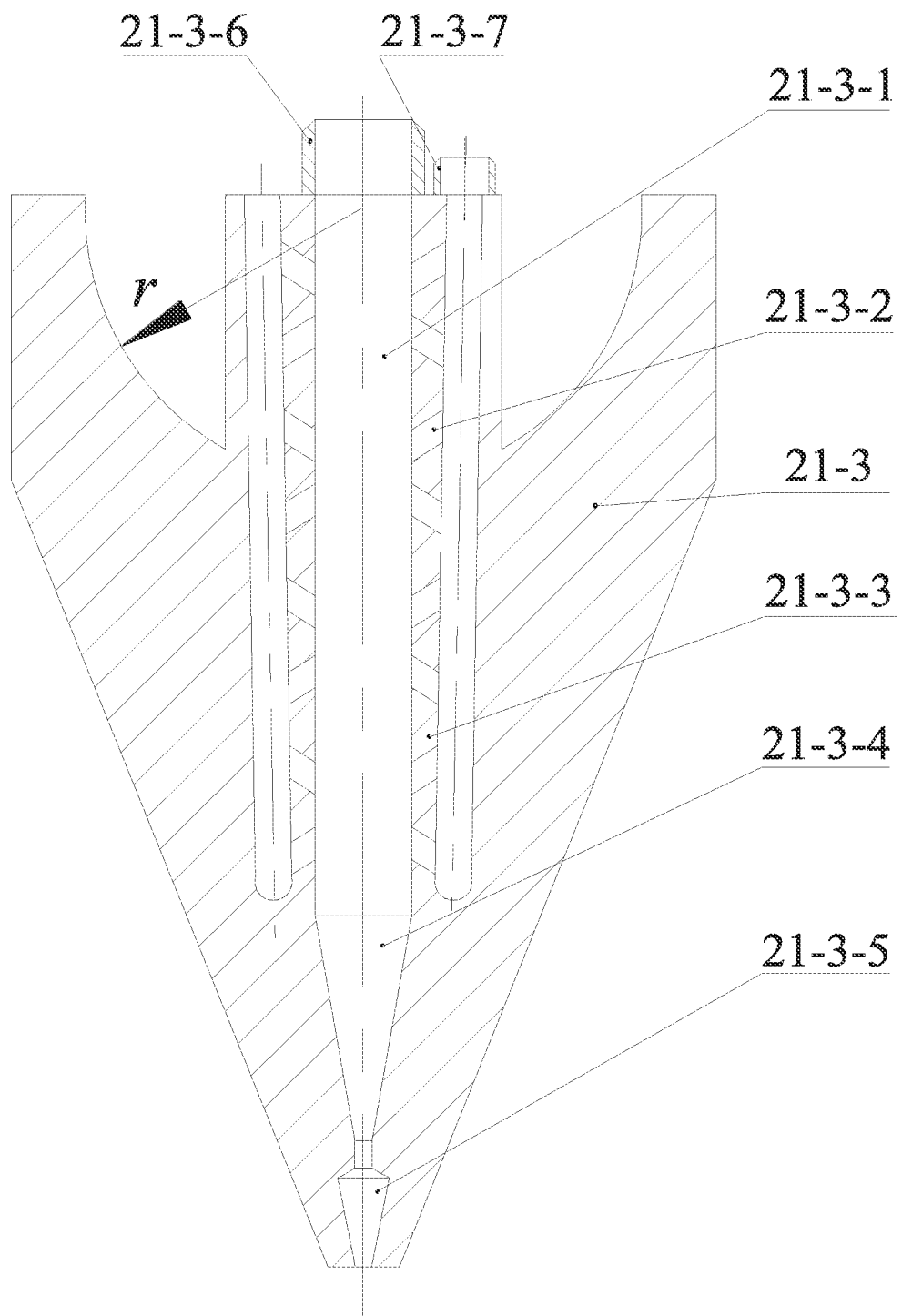
FIG. 12 is a sectional view of a nozzle body structure.

FIG. 12 is a sectional view of the nozzle body 21-3. When at work, the nanofluid enters a fluid injection channel connector 21-3-6 of the nozzle body through the fluid path tube 25, and a high-pressure gas enters a gas injection channel connector 21-3-7 of the nozzle body through a gas path tube 26. The high-pressure gas enters a mixing chamber 21-3-1 through air vents 21-3-2 distributed in an air vent wall 21-3-3, is fully mixed and atomized with the nanofluid from the fluid injection channel connector 21-3-6 in a nozzle mixing chamber 21-3-1, and enters a swirl chamber 21-3-5 after being accelerated in an accelerating chamber 21-3-4, so that the high-pressure gas and the nanofluid are further mixed and accelerated, and are sprayed to the grinding area through the nozzle outlet in the form of atomized droplets.

Figure 13:
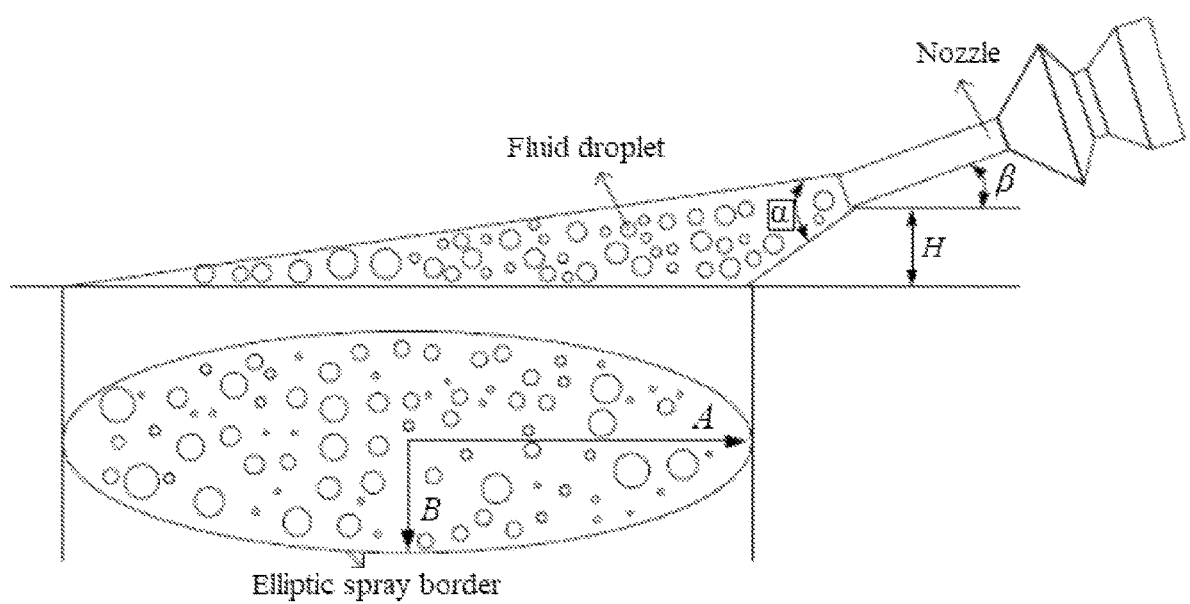
FIG. 13 is an elliptic spray border of nanofluid.

After the angle and the height of the nozzle I 21 are adjusted, the heat insulation device end cover 503 is fixed to the heat insulation device 505, and the power supply of the heating plate 506 is turned on so that the heating plate 506 work at the constant heat flux qt. After the system is stable (that is, when the temperatures measured by the two thermocouples no longer change), the minimum quantity lubrication device 4 is opened to spray the nanofluid droplets on the surface of the workpiece I 23 at a certain angle, speed and height. The measurement principle of the nanofluid cutting fluid convective heat transfer coefficient and the nanofluid/workpiece heat partition ratio is as follows:

As shown in FIG. 13, for the nozzle, the spray inclination angle is β, the spray cone angle is α, the nozzle height is H, and it is assumed that the nozzle always keeps an impact area formed on the surface of the heat source be tangent to the heat source. The inclined nozzle has a closed elliptic or parabolic spray border. In order to spray more droplets into the processing area, the spray border should be elliptic, that is, $0 < \pi/2 - \beta < \pi/2 - \alpha/2$. It is set that the major axis of the ellipse is 2A and the minor axis is 2B, an intermediate variable C is introduced, and it is set that $C = 2\cos(\alpha+\beta/2)\cos(\alpha-\beta/2)$. The elliptic border equation is:

$$\frac{(x-x_0)^2}{A^2} + \frac{(y-y_0)^2}{B^2} = 1 \quad (7)$$

in which:

$$A = H\frac{1}{2C}\sin\beta, \quad B = H\sqrt{\frac{1}{C}}\sin\frac{\beta}{2}.$$

Figure 14:
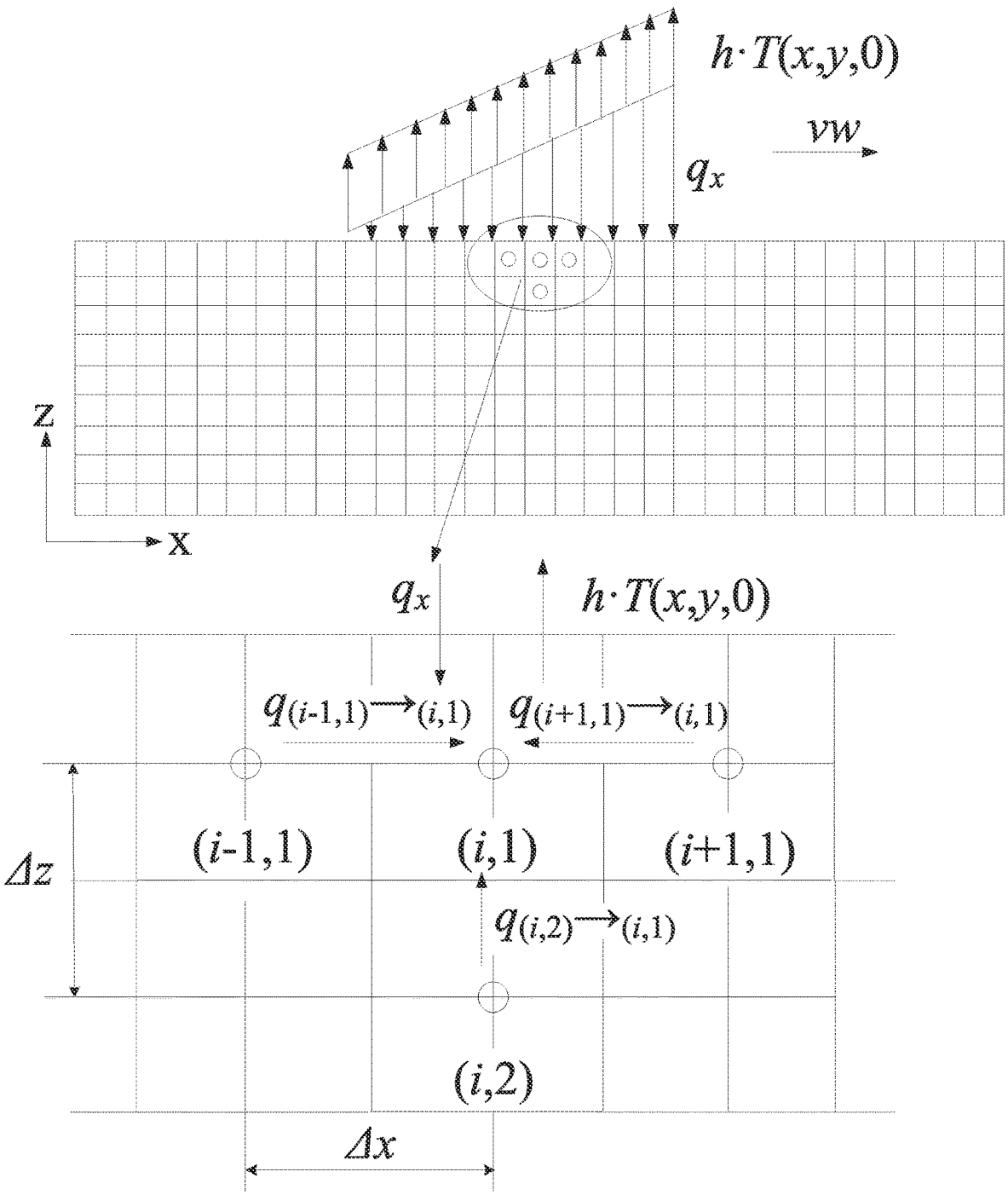
FIG. 14 is a schematic diagram of internal heat conduction of a workpiece.

In a temperature field model, the consecutive input heat of the heat source, the internal heat conduction in the matrix of the workpiece and the heat convection on the surface of the workpiece follow the first law of thermodynamics and the Fourier heat transfer law. Assuming that no heat exchange occurs on both sides of a heat source zone, a grinding temperature field can be simplified as two-dimensional heat transfer for analysis. In a transient temperature field, the field variable $T(x,z,t)$ satisfies a heat balance differential equation of heat conduction:

$$k_x\frac{\partial^2 T}{\partial x^2} + k_z\frac{\partial^2 T}{\partial z^2} = \rho_w c_w \frac{\partial T}{\partial t} \quad (8)$$

in which: kx, kz represent thermal conductivities on x and z directions. The workpiece is assumed to be a rectangular plane, and is discretized and decomposed into a planar grid structure. As shown in FIG. 14, an equal spatial step length $\Delta x = \Delta z = \Delta l$ is extracted, two groups of parallel lines with equal intervals are drawn for sectioning the rectangular workpiece, and the equation of the parallel lines is:

$$\begin{cases} x = x_i = i\Delta l, \ i = 0, 1, \ldots, M, \ M\Delta l = a \\ z = z_j = j\Delta l, \ j = 0, 1, \ldots, N, \ N\Delta l = b \end{cases} \quad (9)$$

in which: xi and zj respectively represent the coordinate value of the ith transverse line forming a differential grid on the x direction and the coordinate value of the jth vertical line on the z direction, a and b respectively represent the length and height of the workpiece, and M and N are respectively natural numbers. After the sectioning, a grid area is obtained through differential calculation, as shown in FIG. 14. A differential equation group is obtained on the basis of a second order difference, that is:

$$\begin{cases} \frac{\partial^2 T}{\partial x^2}(i,j) = \frac{T(i,j+1) + T(i,j-1) - 2T(i,j)}{\Delta l^2} + O(\Delta l^2) \\ \frac{\partial^2 T}{\partial z^2}(i,j) = \frac{T(i+1,j) + T(i-1,j) - 2T(i,j)}{\Delta l^2} + O(\Delta l^2) \\ \frac{\partial T}{\partial t}(i,j) = \frac{T_{t+\Delta t}(i,j) - T_t(i,j)}{\Delta t} + O(\Delta t) \end{cases} \quad (10)$$

The differential equation of nodes in the internal grid can be obtained as follows:

$$T_{t+\Delta t}(i,j) = \frac{\Delta t \begin{Bmatrix} k_x \cdot [T(i,j+1) + T(i,j-1)] + \\ k_z \cdot [T(i+1,j) + T(i-1,j)] \end{Bmatrix}}{\rho_w c_w \Delta l^2} + \left[1 - \frac{2\Delta t(k_x + k_z)}{\rho_w c_w \Delta l^2}\right] T_t(i,j) \quad (11)$$

In FIG. 6, only the upper surface of the workpiece in the heat insulation device exchanges heat with the outside, and the rest three surfaces are heat insulated. According to the Newton cooling law, the temperature convection heat change between the border layer of the workpiece and the cooling heat transfer medium is expressed as:

$$Q_w = h(T|_s - T_a) \quad (12)$$

in which: Qw represents heat convection flow of the hot flow loading surface of the workpiece and a heat exchange medium, Tls represents the temperature of the hot flow loading surface, and Ta represents the temperature of the cooling heat exchange medium. The differential equation on the third type border can be expressed as:

$$h(T|_{z=0} - T_0) - k_z \frac{\partial T}{\partial z}|_{z=0} = q_x \quad (13)$$

Assuming that the room temperature is T0, i.e., the initial condition:

$$T|_{t=0} = T_0 \quad (14)$$

Figure 15:
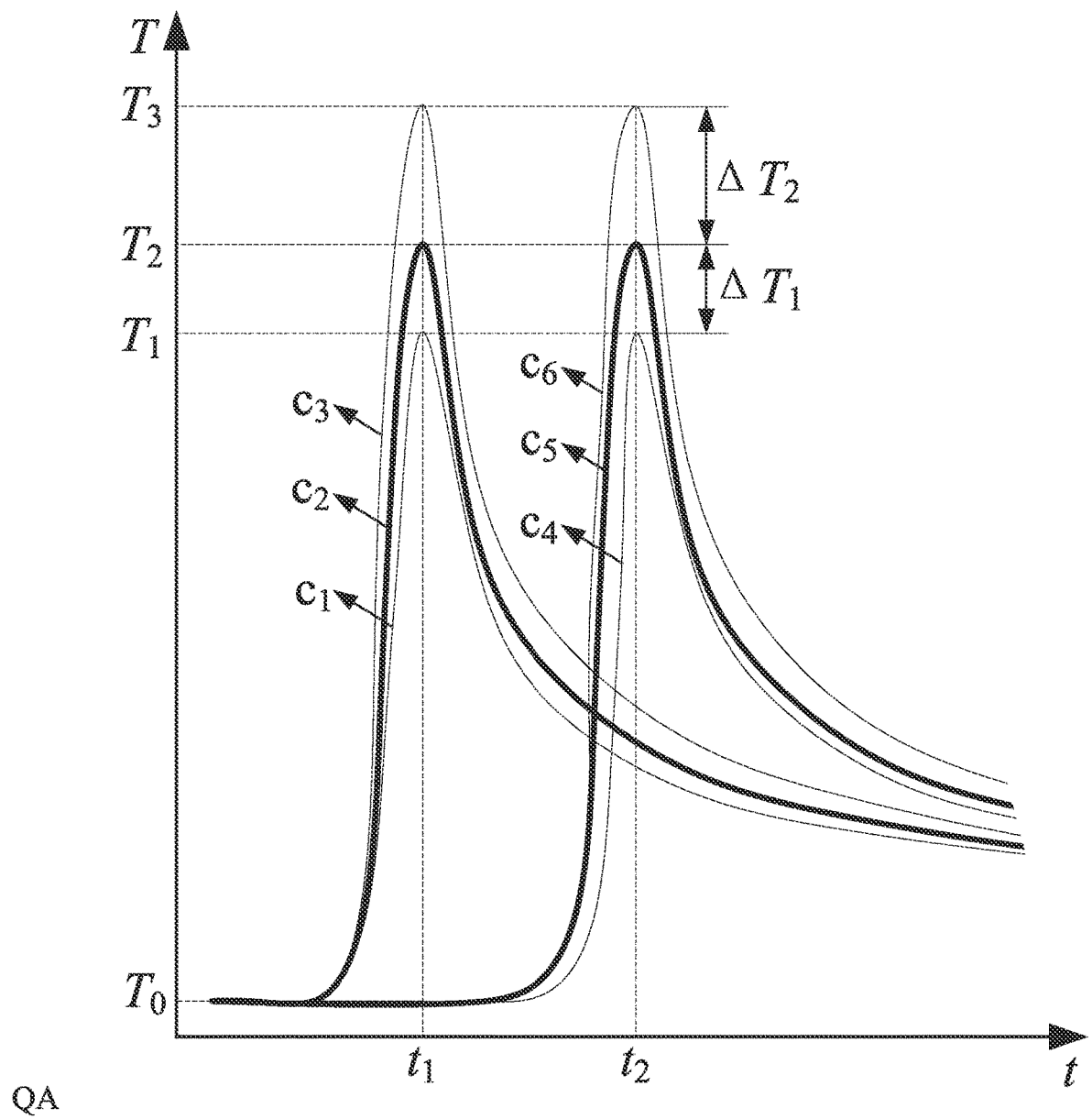
FIG. 15 is a simulated temperature curve chart measured by a thermocouple.

Inversion Program:
The value range of heat flux is q1-q2, search is performed at a step length lq, and then the heat flux has $$Nq\left(N_q = \frac{q_2 - q_1}{l_q} + 1\right)$$

values in total; the value range of the convective heat transfer coefficient is h1-h2, search is performed at the step length lh, and then the convective heat transfer coefficient has $$Nh\left(N_h = \frac{h_2 - h_1}{l_h} + 1\right)$$

values in total, and the heat flux and the convective heat transfer coefficient have N' (N'=(Nq+Nh)!/Nq!/Nh!) combinations in total. The temperature curves at points P1 and P2 of each combination are calculated by formulas (11)-(14), 2N' temperature curves are obtained by the N' combinations in total, compared with the temperature curves measured by the two thermocouples, as shown in FIG. 15, with two combinations (q', h'), (q", h") as an example, c1 and c3 respectively represent the temperature curves simulated at the point P1 using (q', h') and (q", h"), c4 and c6 respectively represent the temperature curves simulated at the point P2 using (q', h') and (q", h"), and c2 and c5 respectively represent the temperature curves measured by the two thermocouples. Then, the combination with the minimum overlapping with the curves c2 and c5 is searched from the 2N' temperature curves, and the combination is the heat flux q and the convective heat transfer coefficient h obtained by inversion processing.

The definition formula of the convective heat transfer coefficient is:

$$q_{w\text{-}f} = h \cdot (t_w - t_f) \quad (15)$$

in which: qw-f represents the heat flux of convective heat transfer between the nanofluid and the surface of the workpiece, and tw and tf respectively represent the temperatures of the surface of the workpiece and the fluid. The heat flux q obtained by the inversion processing is qw-f, and it is known that the heating plate 506 works at the constant heat flux qt, then the heat flux taken away by the nanofluid is:

$$q_f = q_t - q_{w\text{-}f} \quad (16)$$

the heat taken away by the nanofluid and the heat transferred into the workpiece are known, then the nanofluid/workpiece heat partition ratio can be obtained:

$$R = \frac{q_f}{q_t} \quad (17)$$

Compared with the prior art, the measurement device and method for the convective heat transfer coefficient and the nanofluid/workpiece heat partition ratio of the nanofluid cutting fluid in the present invention have the advantages of simulating the air flow field at the nozzle outlet of the actual nanoparticle jet minimum quantity lubrication, as the heat insulation device where the workpiece is located is formed by the composite material formed by the alumina ceramic and the carbon nanotubes, it can ensure that the heat generated by the heat source can be only transferred to the surface of the workpiece along the vertical direction; based on a mathematical model of exact solutions, and starting from the analytic solution of the differential heat conduction equation of the workpiece, the convective heat transfer coefficient and the nanofluid/workpiece heat partition ratio of the nanofluid cutting fluid are accurately inverted.

Figure 16:
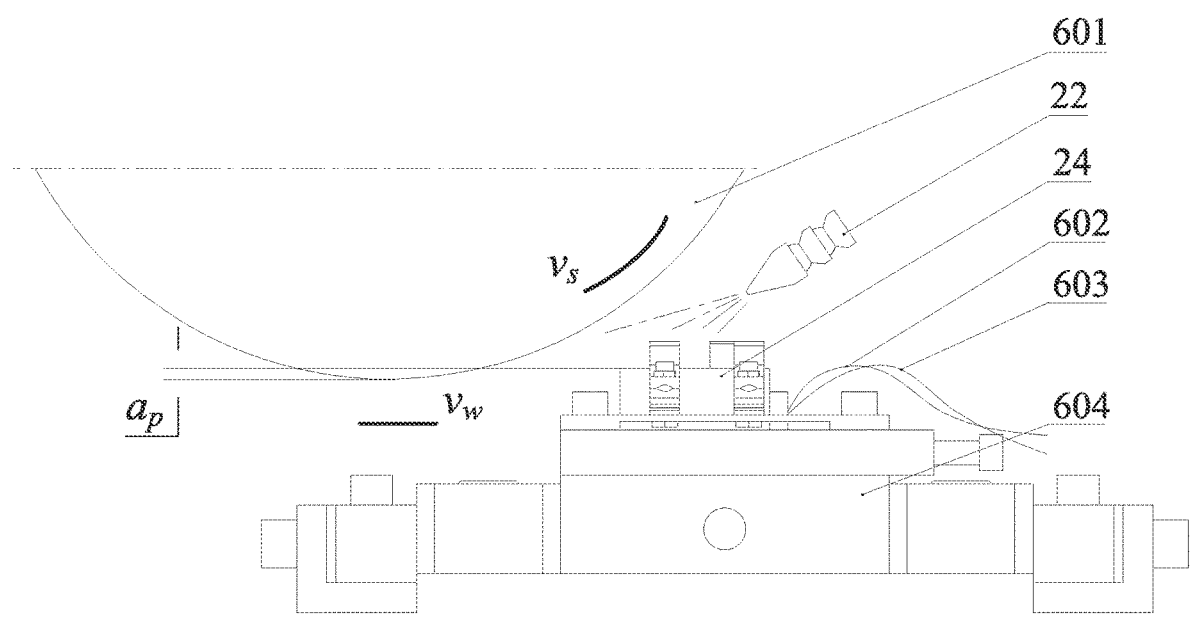
FIG. 16 is a grinding force and grinding temperature measurement device in a first embodiment.

The embodiment as shown in FIG. 16 is the grinding force and grinding temperature measurement device, the peripheral speed of a grinding wheel 601 is vs, the feeding speed of a workpiece II 24 is vw, and the grinding depth is ap, the nanofluid droplets are sprayed onto the surface of the workpiece II 24 by a nozzle II 22, a thermocouple II 602 and a thermocouple IV 603 measure the surface temperature of the workpiece II 24, a grinding dynamometer 604 is used for measuring the grinding force.

Figure 17:
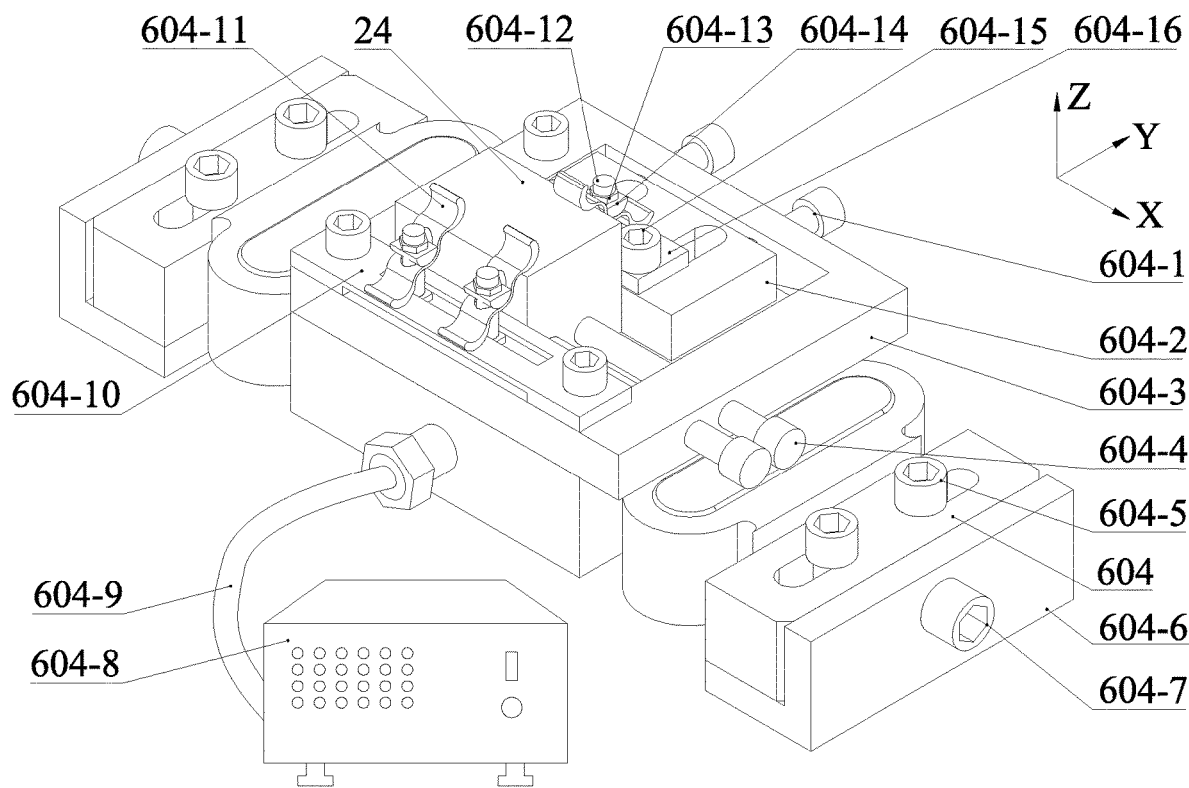
FIG. 17 is a diagram of clamping the workpiece on a grinding dynamometer.

The clamping mode of the workpiece II 24 on the grinding dynamometer 604 is as shown in FIG. 17, front and back dynamometer bases 604-6 fix the dynamometer and are clamped by a screw IV 604-5 and a screw V 604-7, and the material of the two bases 604 is a magnetically permeable metal. A surface grinder worktable is opened, and the worktable is magnetized to absorb the bases 604-6 of the dynamometer on the worktable. An annular block 604-3 is fixed to the worktable of the dynamometer, and the workpiece II 24 is placed on the worktable of the dynamometer, and the six degrees of freedom of the workpiece II 24 can be completely located by the annular block 604-3 and the worktable of the dynamometer. The workpiece II 24 is clamped by two screws II 604-1 on the Y-axis direction, and the workpiece II 24 is clamped by two screws III 604-4 on the X direction. One surface of a stop dog 604-2 is in contact with the side face of the workpiece II 24, one surface is in contact with the two screws II 604-1, and the screws II 604-1 are screwed to clamp the stop dog 604-2 on the Y direction of the workpiece II 24. The workpiece II 24 is clamped by three pressing plates 604-11 on the Z direction, the three pressing plates 604-11 form a self-adjusting pressing plate via a flat plate I 604-10, a flat plate II 604-16, a gasket III 604-14, a screw VI 604-12 and a nut 604-13, and the flat plate II 604-16 is fixed to the stop dog 604-2 by a screw VII 604-15. When the sizes of length, width and height of the workpiece II 24 change, the equipment can be adjusted through two screws III 604-4, two screws II 604-1 and three flat plates I 604-10, and the size change requirements of the workpiece II 24 can be met. The stop dog 604-2 is clamped by the screw VII 604-15 and the screw II 604-1. When the workpiece II 24 is subjected to the grinding force, a measurement signal is transmitted to a data collector 604-8 via a dynamometer signal transmission line 604-9 and is transmitted to a control system.

Figure 18:
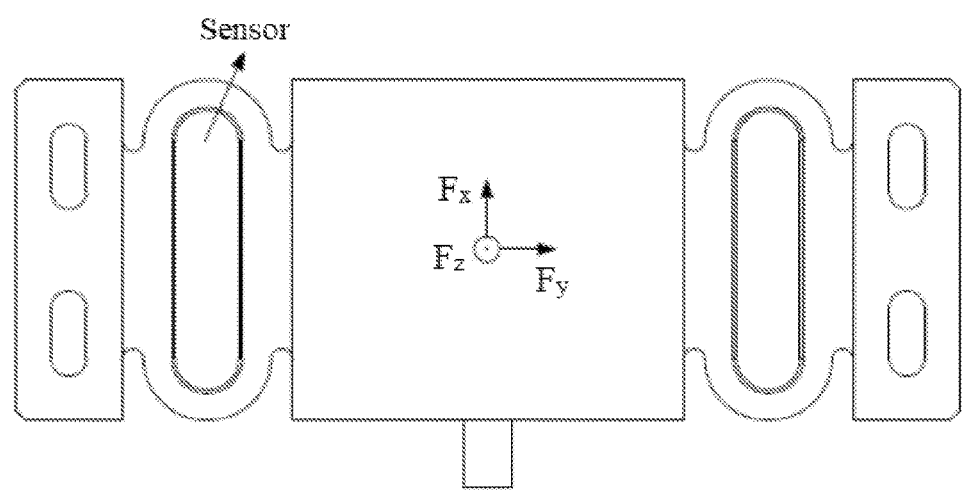
FIG. 18 is a grinding dynamometer platform.

FIG. 18 shows the grinding dynamometer platform, which is composed of an integral member and two piezoelectric quartz crystal three-dimensional force sensors. The sensor is formed by installing three pairs of quartz crystal wafers with different cuts in a shell. A pair of wafers having a longitudinal piezoelectric effect is adopted and can only measure the Z direction force of the vertical platform; while the other two pairs of wafers adopt the cuts having a tangential effect and are placed to form 90° on the mutual sensitivity direction, so that the components on the X and Y directions can be measured. Therefore, when the force on any direction in the space acts on the sensor, the sensor can automatically decompose the force into the three components that are orthogonal to each other in space.

The grinding energy consumed in the grinding process, except for a very small part thereof consumed as the surface energy required for the formation of a new surface, the strain energy remaining on the grinding surface layer and the kinetic energy for the flying off of grinding debris, the vast majority is converted into heat energy in the contact area, the heat energy is transferred into the workpiece, the grinding wheel the grinding debris and the grinding fluid in the form of heat conduction and heat convection. Therefore, the total heat flux qtotal generated by the grinding area includes the heat flux qw flowing into the workpiece, the heat flux qch flowing to the grinding debris, the heat flux qf entering the grinding fluid, and the heat flux qs flowing to the grinding wheel, that is:

$$q_{total} = q_w + q_{ch} + q_f + q_s \tag{18}$$

wherein, the total heat flux is:

$$q_{total} = \frac{F_t \cdot v_s}{l_c \cdot b} \tag{19}$$

in which: Ft represents the measured grinding tangential force, lc represents the contact arc length of the workpiece and the grinding wheel, and b represents the width of the grinding wheel.

The embodiment as shown in FIG. 19 is a sectional view of a milling dynamometer. As shown in the figure, a locating shaft 6'025 is fixed to a machine tool, and as the locating shaft 6'025 is integrated with a fixing jacket 6'022, the fixing jacket 6'022 is also stationary. A Morse spindle 6'01 is connected to a machine tool spindle and rotates with the machine tool spindle. A tool 6'019 is subjected to a counteracting cutting force of the workpiece during the cutting, since the tool 6'019 is fixed to the spindle lower end 6'016 by a locking nut 6'018 and a chuck 6'017, the cutting force is transmitted from the tool 6'019 through the chuck 6'017 to the spindle lower end 6'016. The spindle lower end 6'016 and the Morse spindle 6'01 clamp a piezoelectric force measurement crystal group 6'010 therebetween through a pre-tightening screw 6'021 and a gasket V 6020, and the cutting force directly acts on the piezoelectric force measurement crystal group 6'010 through the spindle lower end 6'016. As the Morse spindle 6'01 withstands forces on the axial and radial directions in the milling process, the device uses a tapered roller bearing I 6'05 and a tapered roller bearing II 6'08. The tapered roller bearing I 6'05 is located by an end cover 6'024 and a sleeve 6'06, and the tapered roller bearing II 6'08 is located by the fixing jacket 6'022 and a sleeve 6'07. Both ends of the bearing are sealed by a sealing ring 16'04 and a sealing ring II 6'09 to prevent the leakage of lubricating oil. The end cover 6'024 is fixed to the fixing jacket 6'022 by a screw VIII 6'02 and a gasket IV 6'03, and the gasket VI 6'023 can adjust the gap and the play of the bearings, and the axial position of the shaft.

Figure 20:
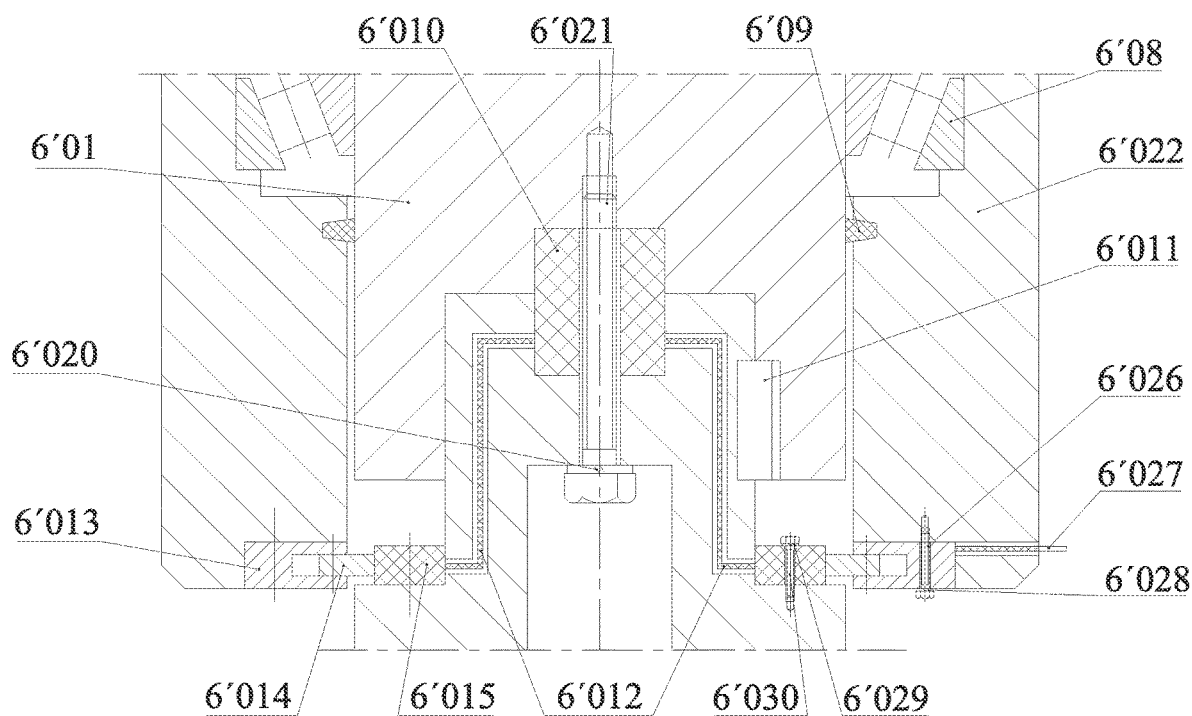
FIG. 20 is an installation diagram of a piezoelectric force measurement crystal group.

As shown in FIG. 20, the piezoelectric force measurement crystal group 6'010 is stressed to generate electric charges, an electric signal is transmitted to a conducting wire connecting block 6'015 through an electrode lead 6'012, and is transmitted by the conducting wire connecting block 6'015 to a roller 6'014, then transmitted by the roller 6'014 to a high voltage conversion device 6'013, further transmitted by an external conducting wire 6'027 to a charge amplifier for signal amplification processing, and finally transmitted by the data collector to the computer for data processing. The high voltage conversion device 6'013 is fixed to the fixing jacket 6'022 by a screw IX 6'026 and a gasket VII 6'028, and the conducting wire connecting block 6'015 is fixed to the spindle lower end 6'016 by a gasket VIII 6'029 and a screw X 6'030. The nanofluid fog drops are sprayed onto the surface of the workpiece II 24 by the nozzle II 22. In the whole process, the Morse spindle 6'01, the piezoelectric force measurement crystal group 6'010, the electrode lead 6'012, the conducting wire connecting block 6'015, the roller 6'014, the spindle lower end 6'016 and the inner rings of the tapered roller bearings rotate along with the machine tool spindle, while the fixing jacket 6'022, the end cover 6'024, the outer rings of the tapered roller bearings and the high voltage conversion device 6'013 are fixed to the machine tool so as to be kept stationary, thereby measuring the cutting force on the rotating tool. During the installation, the conducting wire connecting block 6'015 is firstly fixed to the spindle lower end 6'016, the high voltage conversion device 6'013 is fixed to the fixing jacket 6'022, the piezoelectric force measurement crystal group 6'010, the spindle lower end 6'016 and a key 6'011 are sequentially installed in the lower end of the Morse spindle 6'01 and are screwed by the gaskets V 6'020 and the pre-tightening screws 6'021, the tool 6'019 is installed in a lower end hole of the spindle lower end 6'016, the chuck 6'017 is installed, and finally the locking nut 6'018 is screwed by the spindle lower end 6'016 and the threads of the locking nut 6'018.

The heat flux in the milling process is:

$$q_{total} = (F_c \cdot \sin\gamma_0 + F_f \cdot \cos\gamma_0) \cdot \frac{V_c \cdot a_c}{a_{ch}} / (L_f \cdot a_w) \tag{20}$$

in which: Fc represents the cutting force on a tool feeding direction, Ff represents the cutting force on a direction vertical to the tool feeding direction, and both Fc and Ff are measured by the dynamometer, and ac represents the cutting depth, ach represents the smear metal depth, Lf represents a tool-debris contact length, γ0 represents a front angle of the tool, aw represents the cutting width, and Vc represents the cutting speed.

The specific working process of the solution is as follows:

The integrated online measurement system for nanofluid thermophysical property parameters is specifically an integrated online measurement system for a nanofluid thermal conductivity, and a convective heat transfer coefficient and a nanofluid/workpiece heat partition ratio of the nanofluid cutting fluid, and is composed of an air compressor 2, a hydraulic pump 3, a nanofluid thermal conductivity measurement device 1, a minimum quantity lubrication device 4, a measurement device 5 for a convective heat transfer coefficient and a nanofluid/workpiece heat partition ratio of the nanofluid cutting fluid, and a grinding force and grinding temperature measurement device 6.

When the system is used for measuring the thermophysical property parameters of the nanofluid cutting fluid, the hydraulic pump 3 is started, the nanofluid stored in the fluid storage tank 9 flows through the fluid pressure regulating valve I 10, the fluid throttle valve I 11, the turbine flowmeter I 12 and the check valve I 13, and enters the glass tube II 1013 through the nanofluid inlet 1012 after flowing out from the check valve I 13 and enters the glass tube I 107 via the connecting port II 1015, the rubber tube 109 and the connecting port I 108, so that the two glass tubes are filled with the nanofluid. After the system is stable, the power supply of a copper wire V 1024 is turned on, and the nanofluid thermal conductivity is measured by the Wheatstone bridge. In order to restrain the influence of the natural convection of the fluid on the measurement of the thermal conductivity of the fluid, the measurement time in is controlled within 5 seconds in one experiment. After the measurement, the check valve II 14 is opened, and the nanofluid flows out from the nanofluid outlet 1011, flows through the check valve II 14 and enters the minimum quantity lubrication device 4.

While the hydraulic pump 3 is started, the air compressor 2 is started, the high-pressure gas enters the compressed gas inlet of the minimum quantity lubrication device 4 after flowing through the filter 15, the gas storage tank 16, the gas pressure regulating valve II 18, the gas throttle valve II 19 and the turbine flowmeter II 20. The nanofluid gas spray ejected by the nozzle I 21 is sprayed to the surface of the workpiece I 23 to form the measurement device 5 for a convective heat transfer coefficient and a nanofluid/workpiece heat partition ratio of the nanofluid cutting fluid. The groove 507 is machined in the bottom of the workpiece I 23, and two through holes are machined in the groove. The thermocouple I 508 and the thermocouple II 509 are respectively introduced into the two through holes from the bottom of the workpiece I 23, and the nodes of the two thermocouples are located on the same plane as the surface of the workpiece I 23. The workpiece I 23 is placed in the heat insulation device 505, and the heating plate 506 is arranged at the bottom of the workpiece I 23. The heating plate 506 is caused to work at the constant heat flux qt, and then the heat can only be transferred from the bottom of the workpiece I 23 to the upper surface of the workpiece I 23. When the system reaches the heat stability state, the nanofluid is ejected from the nozzle I 21 and then is sprayed on the surface of the workpiece I 23 in the form of jet flow, the two thermocouples transmit the collected temperature signals to the data processor, and the convective heat transfer coefficient and the nanofluid/workpiece heat partition ratio of the nanofluid cutting fluid are measured by the inversion processing program of the computer.

The first embodiment of the present invention is a grinding force and grinding temperature measurement device under nanoparticle jet minimum quantity lubrication conditions, the surface grinder worktable is opened, and the worktable is magnetized to absorb the bases 604-6 of the dynamometer on the worktable. The annular block 604-3 is fixed to the worktable of the dynamometer, and the workpiece II 24 is placed on the worktable of the dynamometer. The six degrees of freedom of the workpiece II 24 can be completely located by the annular block 604-3 and the worktable of the dynamometer. The workpiece II 24 is clamped by two screws II 604-1 on the Y-axis direction, and the workpiece II 24 is clamped by two screws III 604-4 on the X direction. One surface of the stop dog 604-2 is in contact with the side face of the workpiece II 24, one surface is in contact with the two screws II 604-1, and the screws II 604-1 are screwed to clamp the stop dog 604-2 on the Y direction of the workpiece II 24. The workpiece II 24 is clamped by three pressing plates 604-11 on the Z direction. When the workpiece II 24 is subjected to the grinding force, the measurement signal is transmitted to the data collector 604-8 via the dynamometer signal transmission line 604-9 and is transmitted to the control system.

The second embodiment of the present invention is a milling force and milling temperature measurement device under nanoparticle jet minimum quantity lubrication conditions, the conducting wire connecting block 6'015 is fixed to the spindle lower end 6'016, the high voltage conversion device 6'013 is fixed to the fixing jacket 6'022, the piezoelectric force measurement crystal group 6'010, the spindle lower end 6'016 and the key 6'011 are sequentially installed in the lower end of the Morse spindle 6'01 and are screwed by the gaskets V 6'020 and the pre-tightening screws 6'021, the tool 6'019 is installed in the lower end hole of the spindle lower end 6'016, the chuck 6'017 is installed, and finally the locking nut 6'018 is screwed by the spindle lower end 6'016 and the threads of the locking nut 6'018. The nanofluid fog drops are sprayed onto the surface of the workpiece II 24 by the nozzle II 22. During the whole process, the Morse spindle 6'01, the piezoelectric force measurement crystal group 6'010, the electrode lead 6'012, the conducting wire connecting block 6'015, the roller 6'014, the spindle lower end 6'016 and the inner rings of the tapered roller bearings rotate along with the machine tool spindle, while the fixing jacket 6'022, the end cover 6'024, the outer rings of the tapered roller bearings and the high voltage conversion device 6'013 are fixed to the machine tool to be kept stationary, thereby measuring the cutting force on the rotating tool.

Although specific embodiments of the present invention have been described above with reference to the drawings, the protection scope of the present invention is not limited thereto. Those skilled in the art to which the present invention belongs should understand that, based on the technical solutions of the present invention, various modifications and variations made by those skilled in the art without any creative effort still fall within the protection scope of the present invention.

We claim:

1. An integrated online measurement system for thermophysical property parameters of a nanofluid cutting fluid, consisting of a gas path system, a fluid path system, a nanofluid thermal conductivity measurement device, a measurement device for a convective heat transfer coefficient and a nanofluid/workpiece heat partition ratio of the nanofluid cutting fluid, and a grinding force and grinding temperature measurement device or a milling force and milling temperature measurement device; wherein the nanofluid thermal conductivity measurement device is located in the fluid path system and comprises a glass tube I and a glass tube II, which communicate with each other, a long platinum wire that is installed in the glass tube II, and a short platinum wire that is installed in the glass tube I, the long platinum wire and the short platinum wire being used as both heating heat sources and temperature measurement elements; the glass tube, in which the long platinum wire is installed, is provided with a nanofluid inlet and a nanofluid outlet, the nanofluid inlet and the nanofluid outlet being connected with the fluid path system respectively via a check valve I and a check valve II; and the measurement device for the convective heat transfer coefficient and the nanofluid/workpiece heat partition ratio comprises a nozzle I and a workpiece I, the grinding force and grinding temperature measurement device comprises a nozzle II and a workpiece II, and the gas path system provides pressure for the nanofluid in the fluid path system, wherein the nozzles I and II are connected to the fluid path system, nanofluid gas spray ejected by the nozzle I is sprayed onto a surface of the workpiece I, and the nanofluid gas spray ejected by the nozzle II is sprayed onto a surface of the workpiece II.

2. The integrated online measurement system for thermophysical property parameters of a nanofluid cutting fluid of claim 1, wherein the gas path system comprises an air compressor, a filter, a gas storage tank, a first pressure regulating valve, a first throttle valve and a first turbine flowmeter, which are connected in sequence.

3. The integrated online measurement system for thermophysical property parameters of a nanofluid cutting fluid of claim 1, wherein a temperature difference between the long platinum wire and the short platinum wire in the nanofluid thermal conductivity measurement device is accurately measured by using a Wheatstone bridge.

4. The integrated online measurement system for thermophysical property parameters of a nanofluid cutting fluid of claim 1, wherein the grinding force and grinding temperature measurement device comprises a thermocouple III, a thermocouple IV and a grinding dynamometer, a surface temperature of a workpiece under a nanoparticle jet minimum quantity lubrication condition is measured by using thermocouples III and IV, and the grinding force is measured by using the grinding dynamometer; and a grinding dynamometer platform consists of an integral member and two piezoelectric quartz crystal three-dimensional force sensors, and the grinding force applied to a workpiece in the grinding process can be decomposed into three components that are orthogonal to each other in space.

5. The integrated online measurement system for thermophysical property parameters of a nanofluid cutting fluid of claim 1, wherein the milling force and milling temperature measurement device comprises a piezoelectric force measurement crystal group, an electrode lead, a conducting wire connecting block and a high voltage conversion device; the piezoelectric force measurement crystal group is installed at a lower end of a Morse spindle to rotate with the spindle and a tool; and the electrode lead is connected with the high voltage conversion device after being fixed by the conducting wire connecting block, and the high voltage conversion device is fixed, so that a cutting force on a rotating tool is measured.

6. The integrated online measurement system for thermophysical property parameters of a nanofluid cutting fluid of claim 1, wherein the fluid path system comprises a nanofluid storage tank, a hydraulic pump, a second pressure regulating valve, a second throttle valve, a second turbine flowmeter, the check valve I and the check valve II, which are connected in sequence; and the check valve I is connected with the nanofluid inlet of the nanofluid thermal conductivity measurement device, and the check valve II is connected with the nanofluid outlet of the nanofluid thermal conductivity measurement device.

7. The integrated online measurement system for thermophysical property parameters of a nanofluid cutting fluid of claim 6, wherein the glass tube I and the glass tube II are connected by a rubber tube via a connecting port I and a connecting port II; when the check valve I is opened and the check valve II is closed, the nanofluid enters the glass tube II via the nanofluid inlet after flowing out from the check valve I, and enters the glass tube I via the connecting port II, the rubber tube and the connecting port I, and the nanofluid can only flow into the nanofluid thermal conductivity measurement device, but cannot flow out; and the check valve II is opened after a temperature difference between the long platinum wire and the short platinum wire is measured, and the nanofluid flows out from the nanofluid outlet.

8. The integrated online measurement system for thermophysical property parameters of a nanofluid cutting fluid of claim 1, wherein the measurement device for the convective heat transfer coefficient and the nanofluid/workpiece heat partition ratio of the nanofluid cutting fluid comprises a heat insulation device, a heating plate, and a thermocouple I and a thermocouple II, wherein the heating plate is horizontally placed in the heat insulation device, the workpiece I is arranged on the heating plate, the two thermocouples are fixed in a through hole of the workpiece I and are placed on an upper surface of the heating plate, and the two thermocouples are respectively led to two through holes in a bottom wall of the heat insulation device after passing by an edge of the heating plate.

9. The integrated online measurement system for thermophysical property parameters of a nanofluid cutting fluid of claim 8, wherein
the heat insulation device is rectangular, and side walls and the bottom wall of the heat insulation device and a heat insulation device end cover are made of a composite material formed by alumina ceramic and carbon nanotubes; the composite material is based on the alumina ceramic, and the carbon nanotubes are formed by performing plasma sintering on fillers; and the carbon nanotubes are arranged perpendicular to a heat transfer direction, and the carbon nanotubes are arranged perpendicular to thickness directions of the heat insulation side walls, the bottom wall and the heat insulation device end cover.

10. The integrated online measurement system for thermophysical property parameters of a nanofluid cutting fluid of claim 8, wherein
the nozzle I and the nozzle II have the same structure and are both composed of a locating clamp, an intermediate sleeve and a nozzle body; a spherical radius of a lower end of the locating clamp, a spherical hole radius of an upper end and a spherical radius of a lower end of the intermediate sleeve, and a spherical hole radius of an upper end of the nozzle body are equal; and a sphere of the lower end of the locating clamp can be installed in a spherical hole in the upper end of the intermediate sleeve, and a sphere of the lower end of the intermediate sleeve can be installed in a spherical hole in the upper end of the nozzle body.

* * * * *